United States Patent
Gordon et al.

(10) Patent No.: US 8,654,837 B2
(45) Date of Patent: *Feb. 18, 2014

(54) DEVICE ADAPTIVE VIDEO TRANSMISSION SYSTEM FOR USE WITH LAYERED VIDEO CODING AND METHODS FOR USE THEREWITH

(71) Applicant: Broadcom Corporation, Irvine, CA (US)

(72) Inventors: Stephen Elliott Gordon, Lexington, MA (US); Xuemin Chen, Rancho Santa Fe, CA (US); Michael Dove, Los Gatos, CA (US); David Rosmann, Irvine, CA (US); Thomas J. Quigley, Franklin, NC (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,208

(22) Filed: Feb. 26, 2013

(65) Prior Publication Data
US 2013/0195174 A1    Aug. 1, 2013

Related U.S. Application Data

(63) Continuation of application No. 11/962,243, filed on Dec. 21, 2007, now Pat. No. 8,416,848.

(51) Int. Cl.
*H04N 7/50* (2006.01)

(52) U.S. Cl.
USPC ............................... 375/240.02; 375/240.17

(58) Field of Classification Search
USPC ................................ 370/240.02, 240.17
See application file for complete search history.

(56) References Cited

U.S. PATENT DOCUMENTS

| | | | |
|---|---|---|---|
| 8,416,848 B2 * | 4/2013 | Gordon et al. | 375/240.02 |
| 2003/0072375 A1 * | 4/2003 | Soundararajan | 375/240.25 |
| 2007/0014346 A1 * | 1/2007 | Wang et al. | 375/240.1 |

* cited by examiner

*Primary Examiner* — Xavier S. Wong
(74) *Attorney, Agent, or Firm* — Garlick & Markison; Bruce E. Stuckman

(57) ABSTRACT

A video transmission system includes a transceiver module that receives a device parameter from a remote device and that transmits a video signal to the remote device, wherein the video signal is transmitted as at least one separate video layer stream chosen from, an independent video layer stream and at least one dependent video layer streams that require the independent video layer for decoding. A control module chooses the at least one separate video layer stream based on the device parameter.

20 Claims, 23 Drawing Sheets

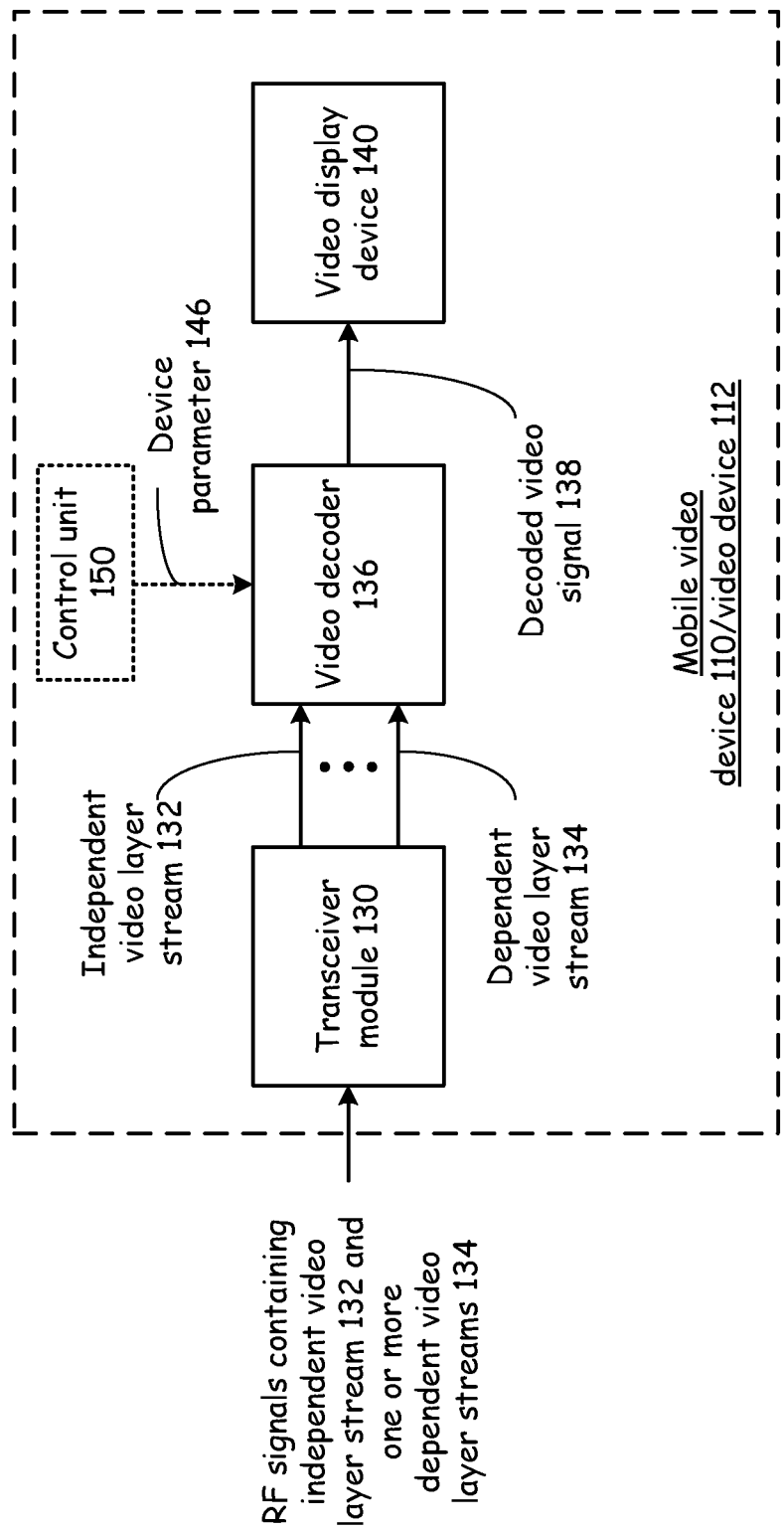

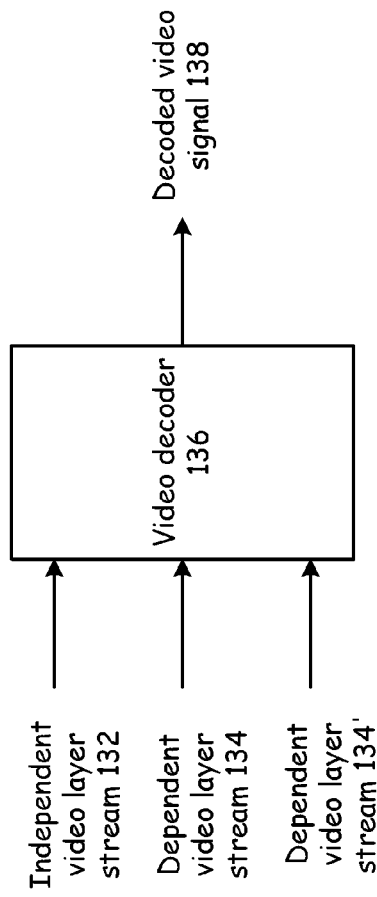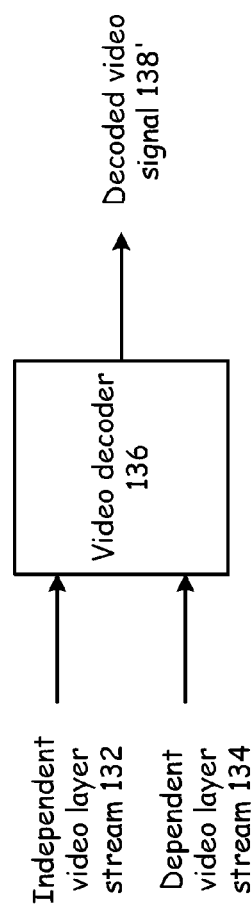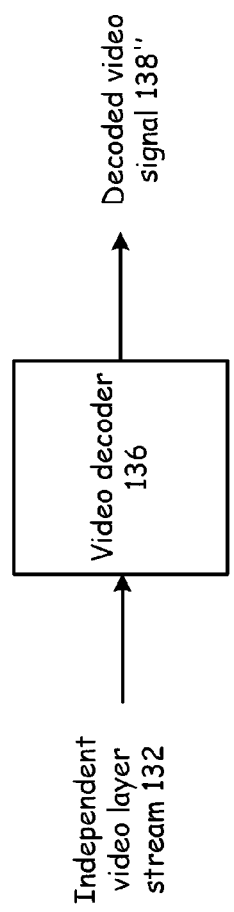

FIG. 17
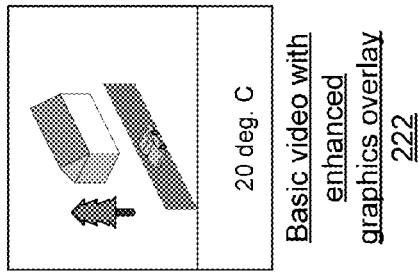
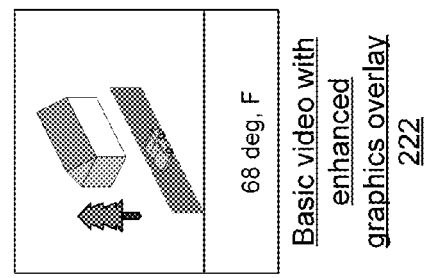
FIG. 18
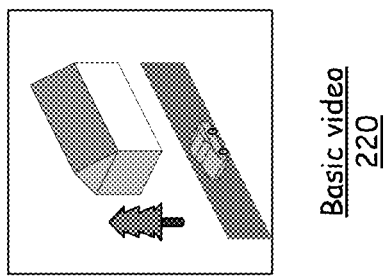

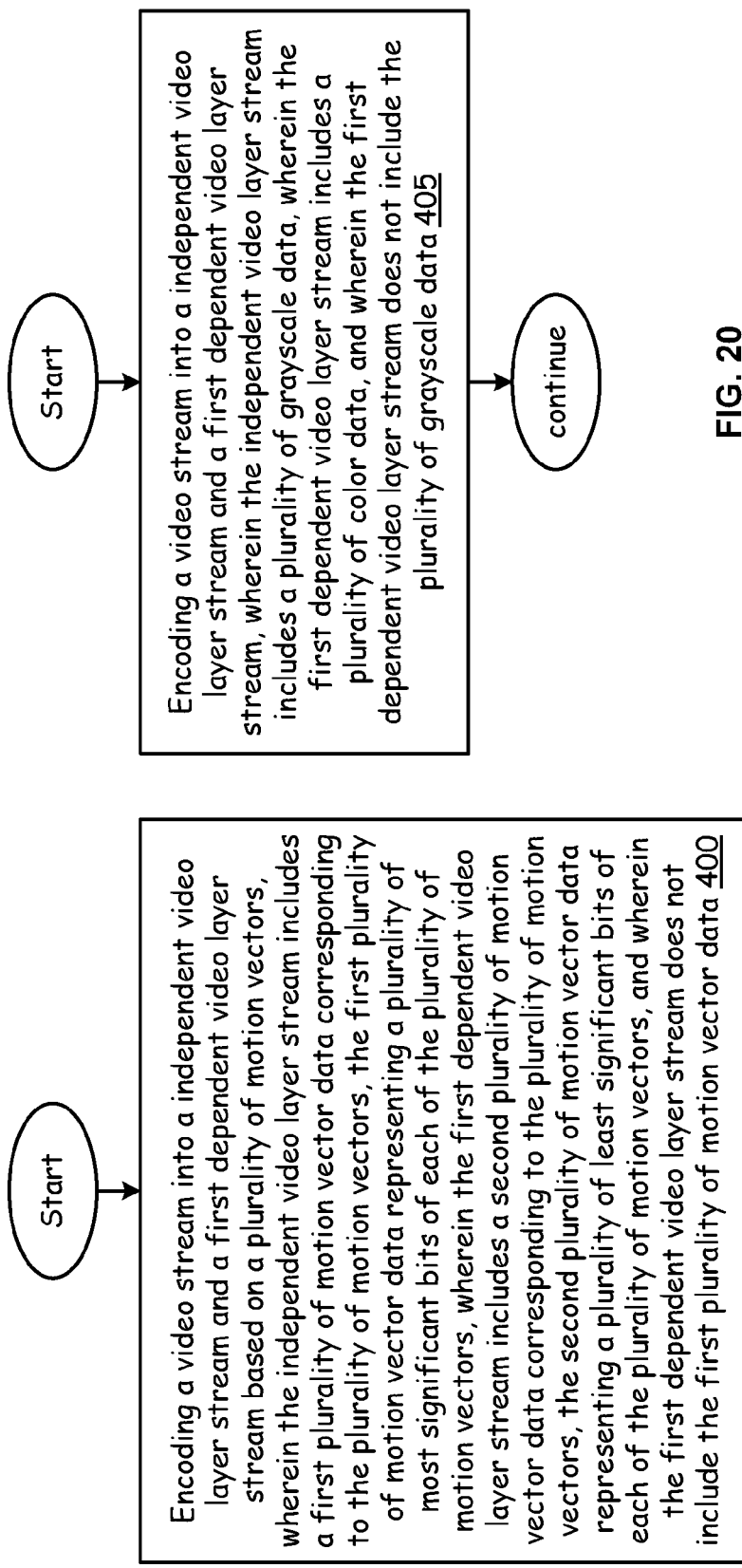

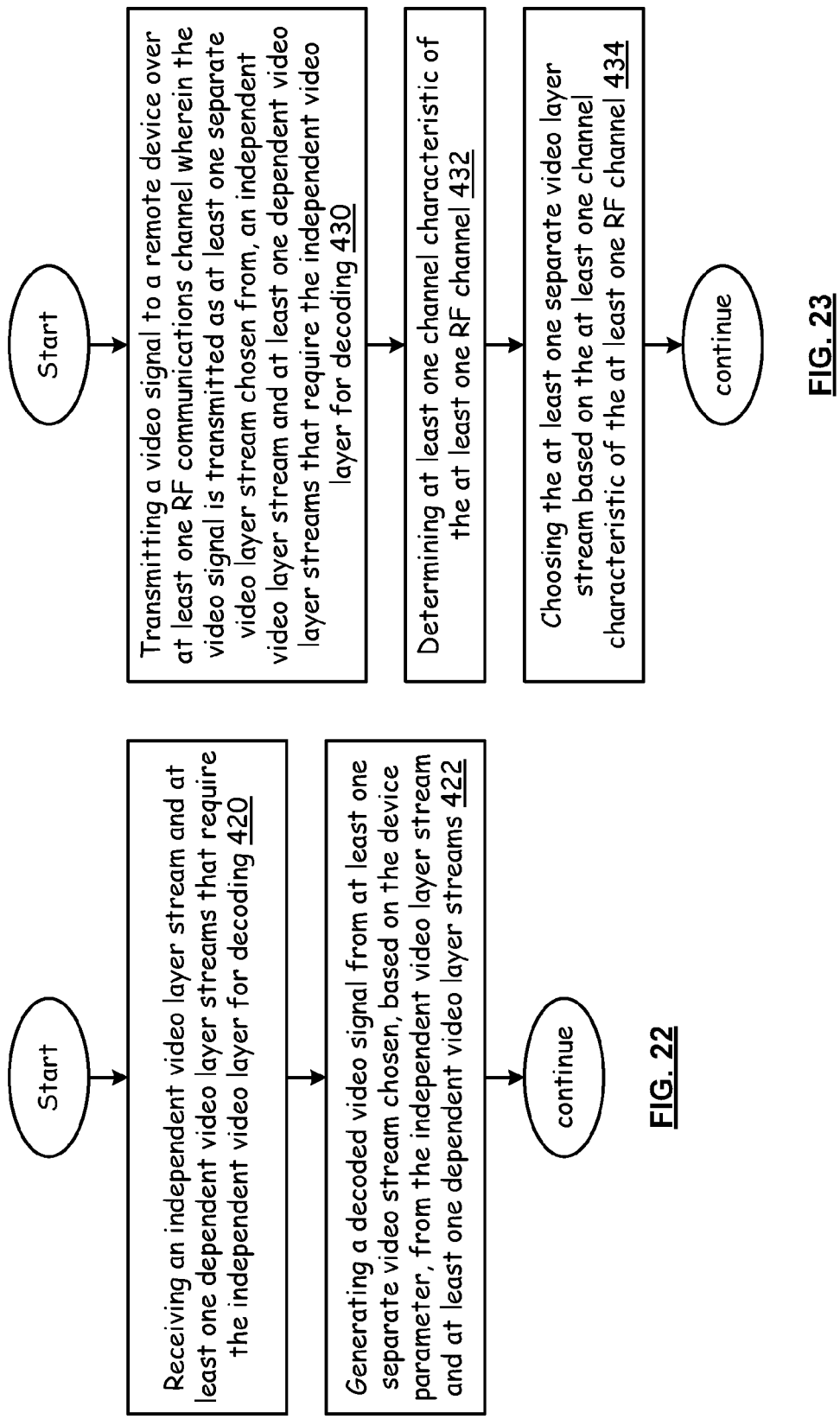

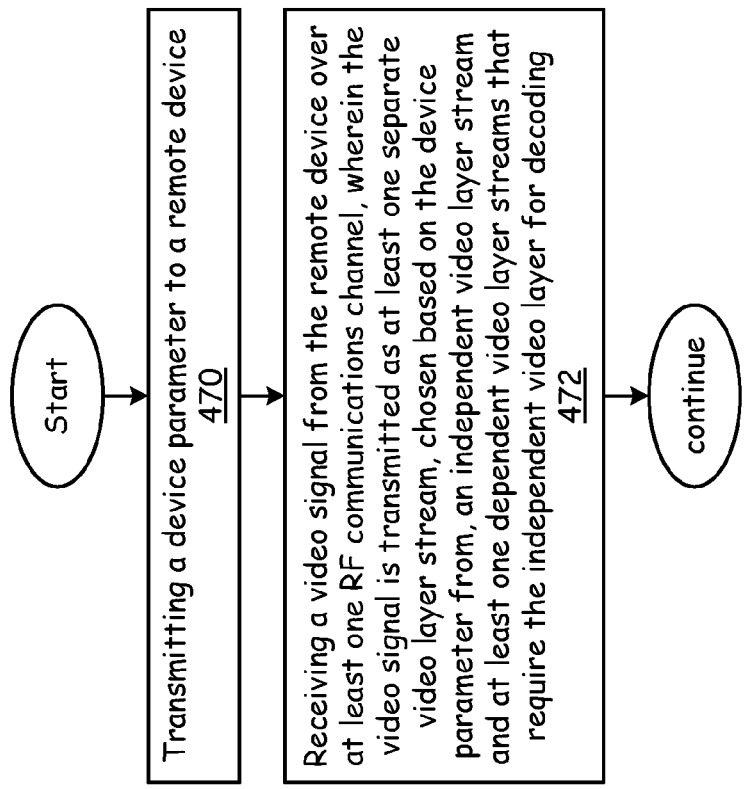
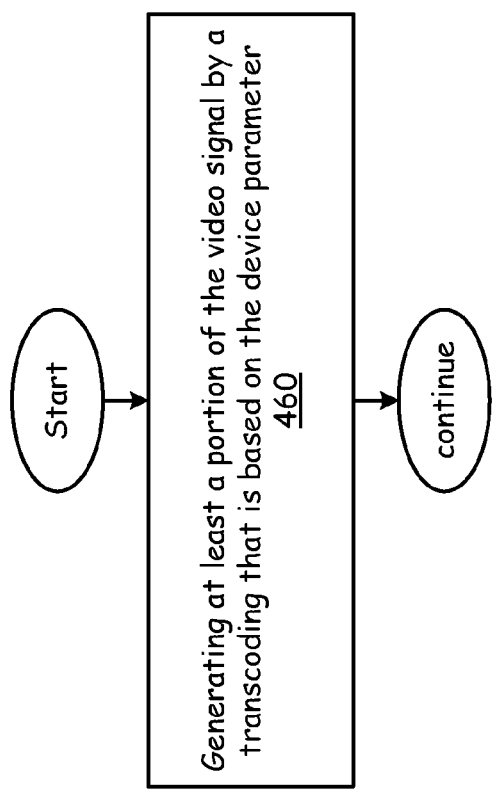

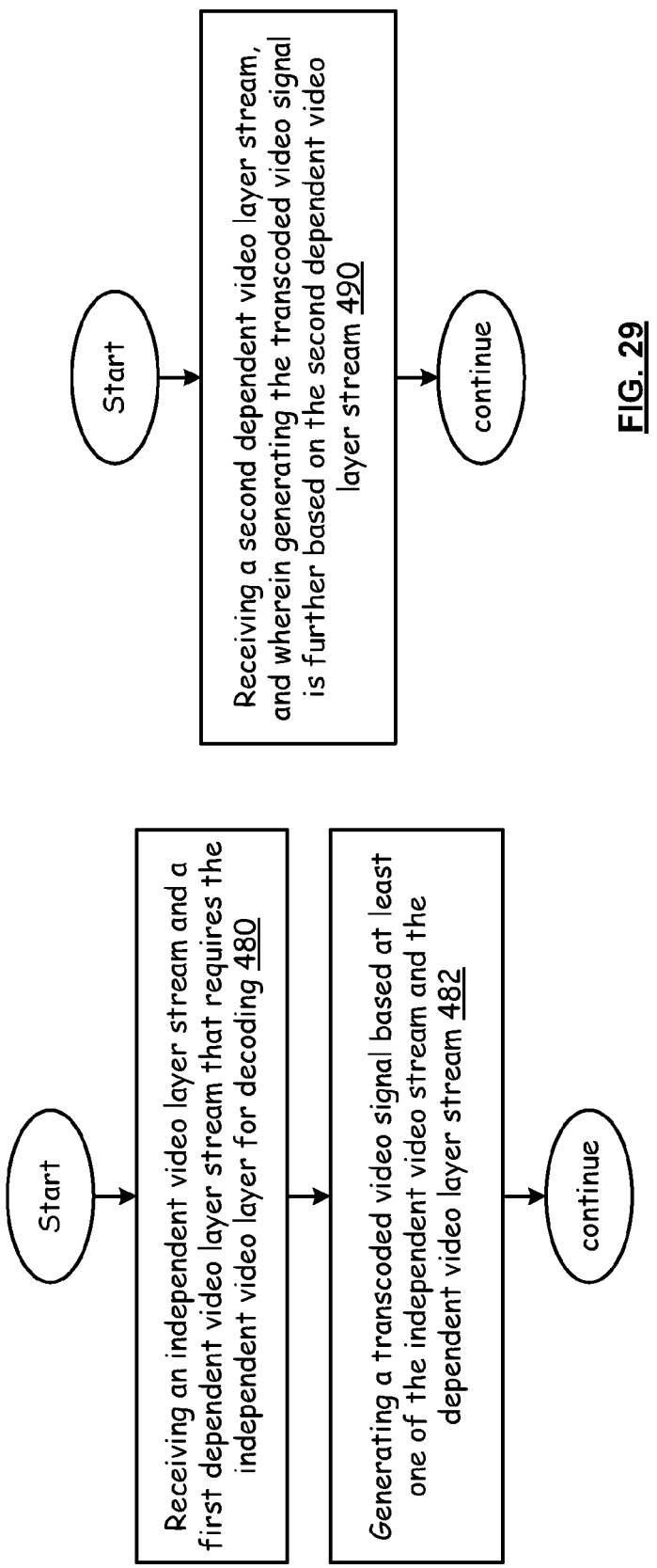

DEVICE ADAPTIVE VIDEO TRANSMISSION SYSTEM FOR USE WITH LAYERED VIDEO CODING AND METHODS FOR USE THEREWITH

CROSS-REFERENCE TO RELATED APPLICATIONS

The present U.S. Utility patent application claims priority pursuant to 35 U.S.C. §120, as a continuation, to the U.S. Utility patent application Ser. No. 11/962,243, entitled DEVICE ADAPTIVE VIDEO TRANSMISSION SYSTEM FOR USE WITH LAYERED VIDEO CODING AND METHODS FOR USE THEREWITH, filed on Dec. 21, 2007, which is hereby incorporated herein by reference in its entirety and made part of the present U.S. Utility patent application for all purposes.

The present application is related to the following patent applications that commonly assigned:

U.S. application Ser. No. 11/957,628, entitled, VIDEO PROCESSING SYSTEM FOR SCRAMBLING VIDEO STREAMS WITH DEPENDENT PORTIONS AND METHODS FOR USE THEREWITH, filed on Dec. 17, 2007, issued as U.S. Pat. No. 8,068,608 on Nov. 29, 2011;

U.S. application Ser. No. 11/959,388, entitled, VIDEO PROCESSING SYSTEM WITH USER CUSTOMIZED GRAPHICS FOR USE WITH LAYERED VIDEO CODING AND METHODS FOR USE THEREWITH, filed on Dec. 18, 2007;

U.S. application Ser. No. 11/961,010, entitled, VIDEO PROCESSING SYSTEM WITH LAYERED VIDEO CODING AND METHODS FOR USE THEREWITH, filed on Dec. 20, 2007, abandoned;

U.S. application Ser. No. 11/959,746, entitled, CHANNEL ADAPTIVE VIDEO TRANSMISSION SYSTEM FOR USE WITH LAYERED VIDEO CODING AND METHODS FOR USE THEREWITH, filed on Dec. 19, 2007, issued as U.S. Pat. No. 8,130,823 on Mar. 6, 2012;

U.S. application Ser. No. 11/968,286, entitled, MOBILE VIDEO DEVICE FOR USE WITH LAYERED VIDEO CODING AND METHODS FOR USE THEREWITH, filed on Jan. 2, 2008;

U.S. application Ser. No. 11/968,870, entitled, VIDEO PROCESSING SYSTEM AND TRANSCODER FOR USE WITH LAYERED VIDEO CODING AND METHODS FOR USE THEREWITH, filed on Jan. 3, 2008;

U.S. application Ser. No. 11/969,299, entitled, VIDEO PROCESSING SYSTEM FOR SCRAMBLING LAYERED VIDEO STREAMS AND METHODS FOR USE THEREWITH, filed on Jan. 4, 2008, issued as U.S. Pat. No. 8,144,781 on Mar. 27, 2012; the contents of which are expressly incorporated herein by reference thereto.

BACKGROUND OF THE INVENTION

1. Technical Field of the Invention

This invention relates generally to coding used in the transmission and processing of video signals and devices that use such coding.

2. Description of Related Art

Communication systems provide several options for obtaining access to broadcast video content. Consumers can receive broadcast standard definition and high definition television broadcasts from the air with an antenna. Analog and digital cable television networks distribute a variety of television stations in most communities on a subscription basis. In addition, satellite television and new internet protocol (IP) television services provide other subscription alternatives for consumers. Analog video signals can be coded in accordance with a number of video standards including NTSC, PAL and SECAM. Digital video signals can be encoded in accordance with standards such as Quicktime, (motion picture expert group) MPEG-2, MPEG-4, or H.264. In addition to digital coding, some video signals are scrambled to provide access to these signals, only to the subscribers that have paid to access the particular content.

The desire for video content has driven cellular telephone networks to begin offering video programs to their subscribers as streaming video. In this fashion, users of mobile devices can have access to video programming on the go. Some of the techniques used in providing broadcast video content to stationary devices are not suitable for adaptation to the viewing environment associated with a handheld mobile device.

The limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 1 presents a block diagram representation of a video network 102 in accordance with an embodiment of the present invention;

FIG. 2 presents a block diagram representation of a video processing system 125 in accordance with an embodiment of the present invention;

FIG. 3 presents a block diagram representation of a mobile video device 110/video device 112 in accordance with an embodiment of the present invention;

FIG. 4 presents a block diagram representation of a video decoder 136 with full decoding in accordance with an embodiment of the present invention;

FIG. 5 presents a block diagram representation of a video decoder 136 with partial reduced decoding in accordance with an embodiment of the present invention;

FIG. 6 presents a block diagram representation of a video decoder 136 with reduced decoding in accordance with an embodiment of the present invention;

FIG. 7 presents a block diagram representation of a video processing system 125' in accordance with an embodiment of the present invention;

FIG. 8 presents a block diagram representation of a video processing system 125" in accordance with an embodiment of the present invention;

FIG. 9 presents a block diagram representation of a mobile video device 110/video device 112 in accordance with an embodiment of the present invention;

FIG. 10 presents a block diagram representation of a scrambling module 160 in accordance with an embodiment of the present invention;

FIG. 11 presents a block diagram representation of a descrambling module 164 in accordance with an embodiment of the present invention;

FIG. 12 presents a block diagram representation of a video processing system 125''' in accordance with an embodiment of the present invention;

FIG. 13 presents a pictorial representation of a scrambled independent video stream 176 in accordance with an embodiment of the present invention;

FIG. 14 presents a block diagram representation of a video processing system 125''' in accordance with another embodiment of the present invention;

FIG. 15 presents a pictorial representation of a descrambling of a scrambled video stream in accordance with an embodiment of the present invention;

FIG. 16 presents a block diagram representation of a mobile video device 110/video device 112 in accordance with an embodiment of the present invention;

FIG. 17 presents a pictorial representation of graphics displays in accordance with an embodiment of the present invention;

FIG. 18 presents another pictorial representation of a graphics display in accordance with an embodiment of the present invention;

FIG. 19 is a flowchart representation of a method in accordance with the present invention;

FIG. 20 is a flowchart representation of a method in accordance with the present invention;

FIG. 22 is a flowchart representation of a method in accordance with the present invention;

FIG. 23 is a flowchart representation of a method in accordance with the present invention;

FIG. 26 is a flowchart representation of a method in accordance with the present invention;

FIG. 27 is a flowchart representation of a method in accordance with the present invention;

FIG. 28 is a flowchart representation of a method in accordance with the present invention;

FIG. 29 is a flowchart representation of a method in accordance with the present invention;

DETAILED DESCRIPTION OF THE INVENTION

Figure 1:
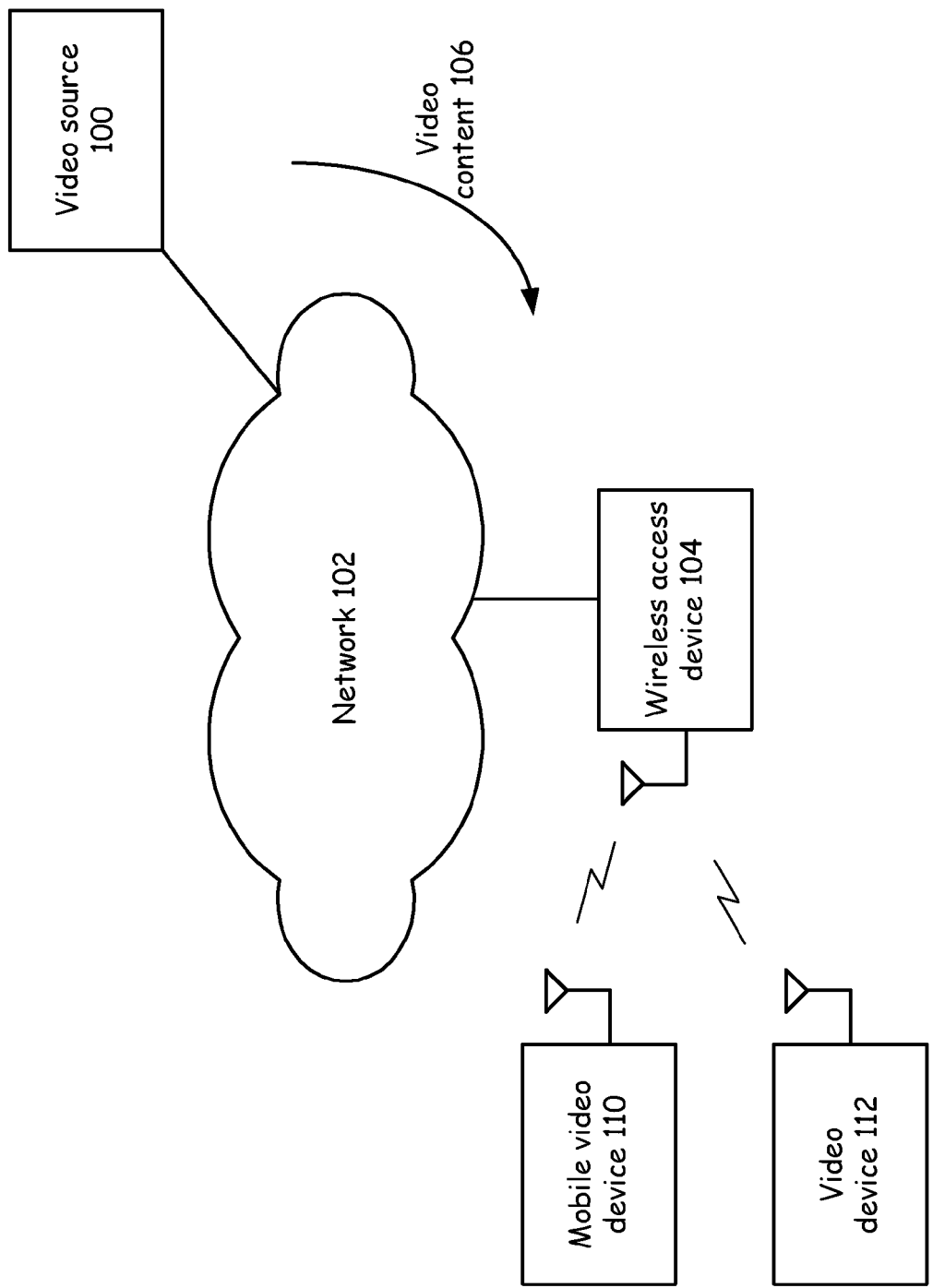

FIG. 1 presents a block diagram representation of a video network 102 in accordance with an embodiment of the present invention. A network 102 is shown that distributes information such as video content 106 from a video source 100 to a wireless access device 104 for wireless transmission to wireless video devices such as mobile video device 110 and video device 112. The video content 106 can include movies, television shows, commercials or other ads, educational content, infomercials, or other program content and optionally additional data associated with such program content including but not limited to digital rights management data, control data, programming information, additional graphics data and other data that can be transferred in associated with program content. Video content 106 can include video with or without associated audio content. The video content 106 can be sent as broadcast video, streaming video, video on demand and near video on demand programming and/or other formats.

The network 102 can be a dedicated video distribution network such as a direct broadcast satellite network or cable television network that distributes video content 106 from a plurality of video sources, including video source 100, a plurality of wireless access devices and optionally wired devices over a wide geographic area. In the alternative, network 102 can be a heterogeneous network that includes one or more segments of a general purpose network such as the Internet, a metropolitan area network, wide area network, local area network or other network and optionally other networks such as an Internet protocol (IP) television network.

The video content 106 can be carried as analog signals such as National Television System Committee (NTSC), Séquentiel couleur à mémoire (SECAM) or Phase Alternating Line (PAL) coded video signals, or digital video signals such as Quicktime, (motion picture expert group) MPEG-2, MPEG-4, H.264, or other format, either standard or proprietary that are carried via an IP protocol such as TCP/IP, Ethernet protocol, Data Over Cable Service Interface Specifications (DOCSIS) protocol or other protocol.

Wireless access device 104 can include a base station or access point that proves video content 106 to a plurality of video subscribers over a cellular network such as an Universal Mobile Telecommunications System (UMTS), enhanced data rates for GSM evolution (EDGE), 3G, 4G or other cellular data network, a wireless local area network (WLAN) such as an 802.11a,b,g,n, WIMAX, or other WLAN network. In addition, the wireless access device can include a home gateway, video distribution point in a dedicated video distribution network or other wireless gateway for wirelessly transmitting video content 106, either alone or in association with other data, signals or services, to mobile video device 110 and/or video device 112.

Mobile video device 110 can include a video enabled wireless telephone or other handheld communication device that is capable of displaying video content. Video device 112 includes other video display devices that may or may not be mobile including a television coupled to a wireless receiver, a computer with wireless connectivity via a wireless data card, wireless tuner, WLAN modem or other wireless link or device that alone or in combination with other devices is capable of receiving video content 106 from wireless access point 104 and storing and/or displaying the video content 106 for a user.

The video source 100, network 102, wireless access device 104, mobile video device 110 and/or video device 112 include one or more features of the present invention that will be described in greater detail in conjunction with FIGS. 2-35 that follow.

Figure 2:
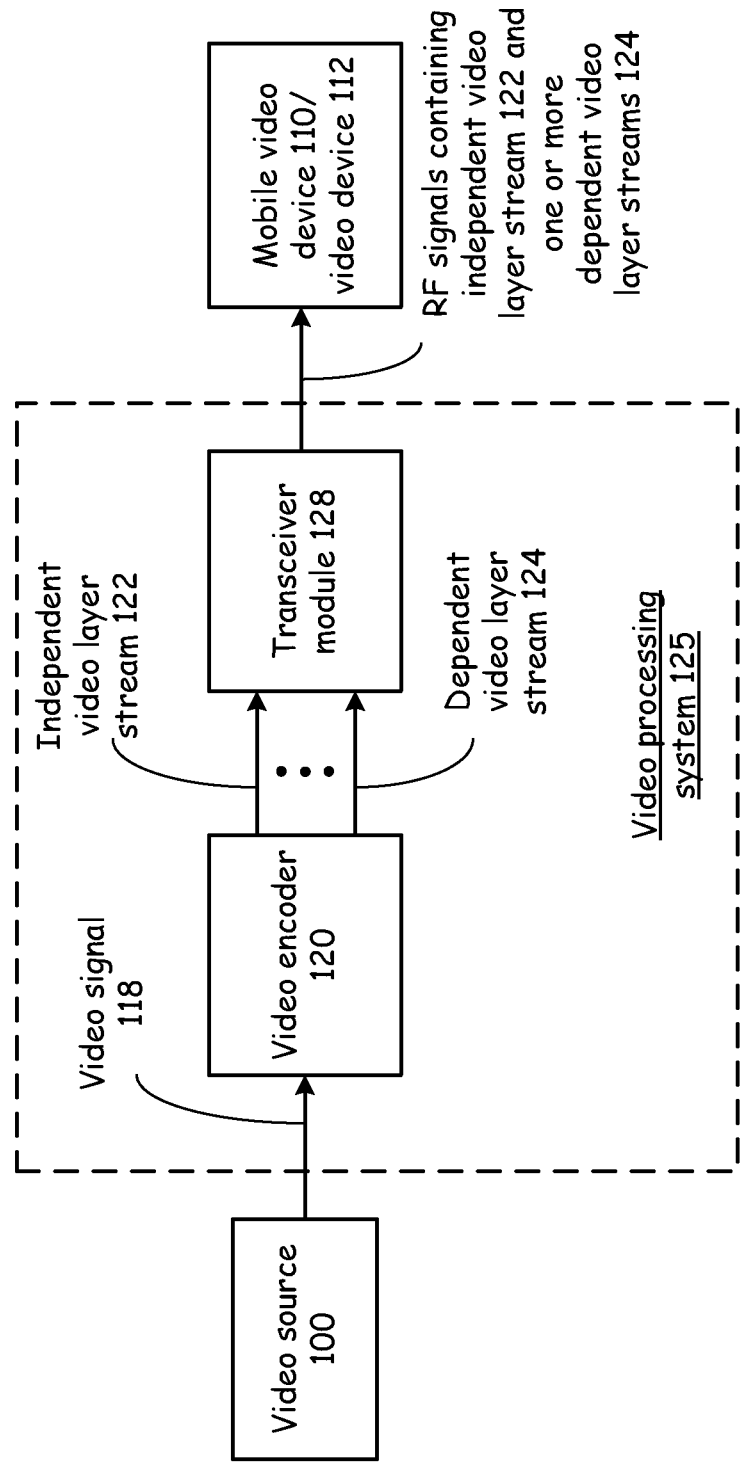

FIG. 2 presents a block diagram representation of a video processing system 125 in accordance with an embodiment of the present invention. A video processing system 125 is shown that can be used in conjunction with network 102 and wireless access device 104. Video processing system 125 includes a video encoder 120 that encodes a video stream that includes video content 106, such as video signal 118 into an independent video layer stream 122 and one or more dependent video layer streams 124. Transceiver module 128 includes a transceiver that creates RF signals containing the independent video layer stream 122 and one or more dependent video layer streams 124 for transmission to mobile video device 110 and/or video device 112. In particular, the independent video layer stream 122 and dependent video layers streams 124 can be sent via separate RF channels, such as separate channels of a dual channel or multi-input multi-output (MIMO) transceiver. In a further embodiment, the independent video layer stream 122 can be multiplexed with the one or more dependent video layer streams 124 via time division multiplexing, frequency division multiplexing, code division multiplexing or via other multiple access multiplexing technique.

While shown as separate from video source 100, video encoder 120 can be incorporated into video source 100 or can be downstream of the video source 100 in network 102. For instance, encoder 120 can be incorporated in a head-end, video server, edge router, video distribution center, or any other network element of network 102. Transceiver 128 can be incorporated into wireless access device 104.

In an embodiment of the present invention the dependent video layer streams 124 are encoded such that each dependent video layer stream is dependent on data from the independent video layer stream 122 for decoding. In an embodiment of the present invention, the independent video layer stream 122 is encoded via MPEG-2, H.264 or other digital compression technique that calculates a plurality of motion vectors for frames or fields of the video signal 118. Independent video layer stream 122 can be a fully encoded video stream that can be decoded in accordance with the particular digital video format used in encoding this video stream. However, independent video layer stream 122 includes less than the full resolution, scale or other information required for decoding of the full data derived from video signal 118.

For example, independent video layer stream 122 includes a first plurality of motion vector data corresponding to the plurality of motion vectors created in the encoding process performed by encoder 120, the first plurality of motion vector data representing a plurality of most significant bits of each of the plurality of motion vectors. In this same example, dependent video layer stream 124 includes a second plurality of motion vector data corresponding to the plurality of motion vectors, the second plurality of motion vector data representing a plurality of least significant bits of each of the plurality of motion vectors. For instance, video encoder uses L bits to represent each motion vector, the N most significant bits are included in the independent video layer stream 122 and the remaining M bits included in the dependent video layer stream. Similarly the bits of the motion vector can be segregated into a plurality of an independent stream that includes the most significant bits and two or more dependent video layer streams that include segregations of the remaining least significant bits. The independent video layer stream 122 can be decoded as normal alone, without the data from dependent video layer stream 124, but with reduced resolution motion vectors. On the other hand, the dependent video layer stream 124 cannot be decoded by itself because it includes only residual motion vector data.

In a further example, the video encoder 120 can further encode the video signal 118 into a second dependent video layer stream not expressly shown, wherein the second dependent video layer stream includes a third plurality of motion vector data corresponding to the plurality of motion vectors, and wherein the second dependent video layer stream does not include the first plurality of motion vector data and does not include the second plurality of motion vector data.

In a particular embodiment, the first plurality of motion vector data includes an integer portion for each of the plurality of motion vectors and the second plurality of motion vector data includes a fractional portion for each of the plurality of motion vectors. In this fashion, the independent video layer stream 122 includes the integer portion of each motion vector and dependent video layer stream 124 includes the fractional portion of each motion vector. In this embodiment, the full resolution motion vectors can be decoded by forming the complete motion from integer portion extracted from the independent video layer stream 122 and the fractional portion extracted from the dependent video layer stream 124. In addition, a reduced resolution motion vector can be decoded from only the integer portion from the independent video layer stream. It should be noted that the dependent video layer stream 124 includes only the fractional components of the motion vectors and thus, cannot be decoded by itself, without access to the integer portions of the motion vectors from the independent video layer stream 122.

In a further embodiment of the present invention, the independent video layer stream 122 includes a plurality of grayscale data such as luma data, and the dependent video layer stream 124 includes a plurality of color data such as chroma data or other color data that is referenced to the grayscale data of the independent video layer stream 122. Further the dependent video layer stream 124 does not include the plurality of grayscale data, and the independent video layer stream 122 does not include the plurality of color data.

In this embodiment, the full color video can be decoded from the grayscale data extracted from the independent video layer stream 122 and the color data extracted from the dependent video layer stream 124. In addition, a grayscale video image can be decoded from only the grayscale data from the independent video layer stream 122. It should be noted that the dependent video layer stream 124 includes only the color data that is referenced to the grayscale data and thus, cannot be decoded by itself, without access to the grayscale data from the independent video layer stream 122.

It should be noted that the above examples of partial/full motion vector data and grayscale/color layering are but are only two of many possible ways of layering video data into an independent video layer stream 122 and one or more dependent video layer streams.

Video encoder 120 can be implemented in hardware, software or firmware. In particular embodiments, the video encoder 120 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video encoder 120 is implemented with two or more devices, each device can perform the same steps, processes or functions in order to provide fault tolerance or redundancy. Alternatively, the function, steps and processes performed by video encoder 120 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video encoder 120 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

FIG. 3 presents a block diagram representation of a mobile video device 110/video device 112 in accordance with an embodiment of the present invention. In mobile video device 110 and/or video device 112 is shown that includes a transceiver module 130 that receives RF signals containing the independent video layer stream 132 and one or more dependent video layer streams 134 and the demodulates and down converts these RF signals to extract the independent video layer stream 132 and the one or more dependent video layer streams 134. Video decoder 136 generates a decoded video signal 138 for video display device 140, such as plasma display, LCD display, cathode ray tube (CRT), either directly or via projection to create a video display for an end-user.

In an embodiment of the present invention independent video layer stream 132 and one or more dependent video layer streams 134 can correspond to the partial/full motion vector data and grayscale/color layering discussion in conjunction with independent video layer stream 122 and one or more dependent video layer streams 134. In addition, independent video layer stream 132 can correspond to a reduced color scale, reduced resolution and/or reduced frame rate signals, and one or more dependent video layer streams 134 including the dependent data that is required for decoding the video content 106 contained therein at full or fuller resolution.

In an embodiment of the present invention, the video decoder 136 receives the independent video layer stream 132 and the one or more dependent video layer streams 134, synchronizes the independent video layer stream 132 and the one or more dependent video layer stream 134 to form a synchronized stream, such as by combining the portions of the motion vectors, synchronizing chroma and luma data, synchronizing frames or fields, et cetera, for decoding to generate a reconstructed video signal, in this case decoded video signal 138, based on the synchronized stream.

As will be described in greater detail in conjunction with FIGS. 4-6, video decoder 136 optionally operates in a plurality of modes of operation. These modes of operation can be selected based on a device parameter 146 received from optional control unit 150 to conform the decoding of the video layer streams that carry the video content 106 to the particular characteristics or the particular state of the device.

In particular, decoder module 136 produces a decoded video signal from at least one separate video stream chosen from the independent video layer stream and the one or more dependent video layer streams, based on the device parameter 146 provided by control unit 150. The device parameter 146 can include a device characteristic such as the device resolution, frame rate, color scale, black and white or color properties of the display device 140 that are stored in control unit 150 of the mobile video device 110/video device 112. For instance, the device resolution of a handheld mobile device may be a reduced resolution that corresponds to the resolution of the independent video layer stream 132. In this case, the decoder can choose to decode only the independent video layer stream 132 as the at least one separate video stream when the device resolution corresponds to the resolution of the independent video layer stream 132. If however, the mobile video device 110, is a full resolution device, video decoder, receives an indication of the high resolution via device parameter 146 and chooses to use the independent video layer stream 132 and each of the dependent video layer streams 134 in decoding to create decoded video signal 138.

In a further embodiment of the present invention, the control unit 150 determines the state of the device, such as a power state and passes this information to the video decoder 136 as device parameter 146. In this fashion, the control unit can control the video decoder 136 to a lower frame rate, lower color scale or to black and white operation, to a reduced resolution and/or to reduced motion vector resolution corresponding to a reduced power state that may include reduced processor speed and reduced computational abilities, shutting down one or more MIMO channels of the transceiver 130 or otherwise reduce the reception bandwidth, et cetera. These changes in reception and decoding based on the reduced power state can save processing power and help increase battery life.

In particular, the decoder module 136 can choose the independent video layer stream 132 as the at least one separate video stream (the only video layer stream decoded) when the power state corresponds to a low power state. In addition, the decoder module 136 can choose the independent video layer stream 132 and each of the at least one dependent video layer streams as the at least one separate video stream when the power state corresponds to another power state that is higher than the low power state.

While described as a device parameter 146 that is based on a characteristic or state of the device, more generally the video decoder 136 operates in different modes of operation correspond to which, if any, of the dependent video layer streams 134 are included in the decoding performed by video decoder 136 to generate the decoded video signal 138.

Video decoder 136 can be implemented in hardware, software or firmware. In particular embodiments, the video decoder 136 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video decoder 136 is implemented with two or more devices, each device can perform the same steps, processes or functions in order to provide fault tolerance or redundancy. Alternatively, the function, steps and processes performed by video decoder 136 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video decoder 136 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

FIG. 4 presents a block diagram representation of a video decoder 136 with full decoding in accordance with an embodiment of the present invention. In particular, in a first mode of operation, video decoder is coupled to receive the independent video layer stream 132 and the one or more dependent video layer streams 134, to synchronize the independent video layer stream 132 and the one or more dependent video layer streams 134 to form a synchronized stream and to generate a reconstructed video signal, such as decoded video signal 138, based on the synchronized stream. As discussed in conjunction with FIG. 2, use of all of the video layer streams allows full decoding, such as with full resolution motion vectors, full color, full frame rate, full color scale, full resolution, et cetera.

FIG. 5 presents a block diagram representation of a video decoder 136 with partial reduced decoding in accordance with an embodiment of the present invention. In another mode of operation, video decoder 136 is coupled to receive the independent video layer stream 132 but less than all of the dependent video layer streams 134. It synchronizes the independent video layer stream 132 and the reduced set of dependent video layer streams 134 to form a synchronized stream and to generate a reconstructed video signal, such as decoded video signal 138', based on the synchronized stream. This partially reduced coding could be based on less than full resolution motion vectors, less than full color resolution, lower frame rate, lower resolution, et cetera.

FIG. 6 presents a block diagram representation of a video decoder 136 with reduced decoding in accordance with an embodiment of the present invention. In this mode of operation, video decoder 136 is coupled to receive the independent video layer stream 132, and to generate a reconstructed video signal, in this case decoded video signal 138", based only the independent video layer stream 132, without the dependent video layer stream2 134. This results in a grayscale video signal, and/or decoded video signal that is based on reduced motion vector resolution, or other reduced video signal.

Figure 7:
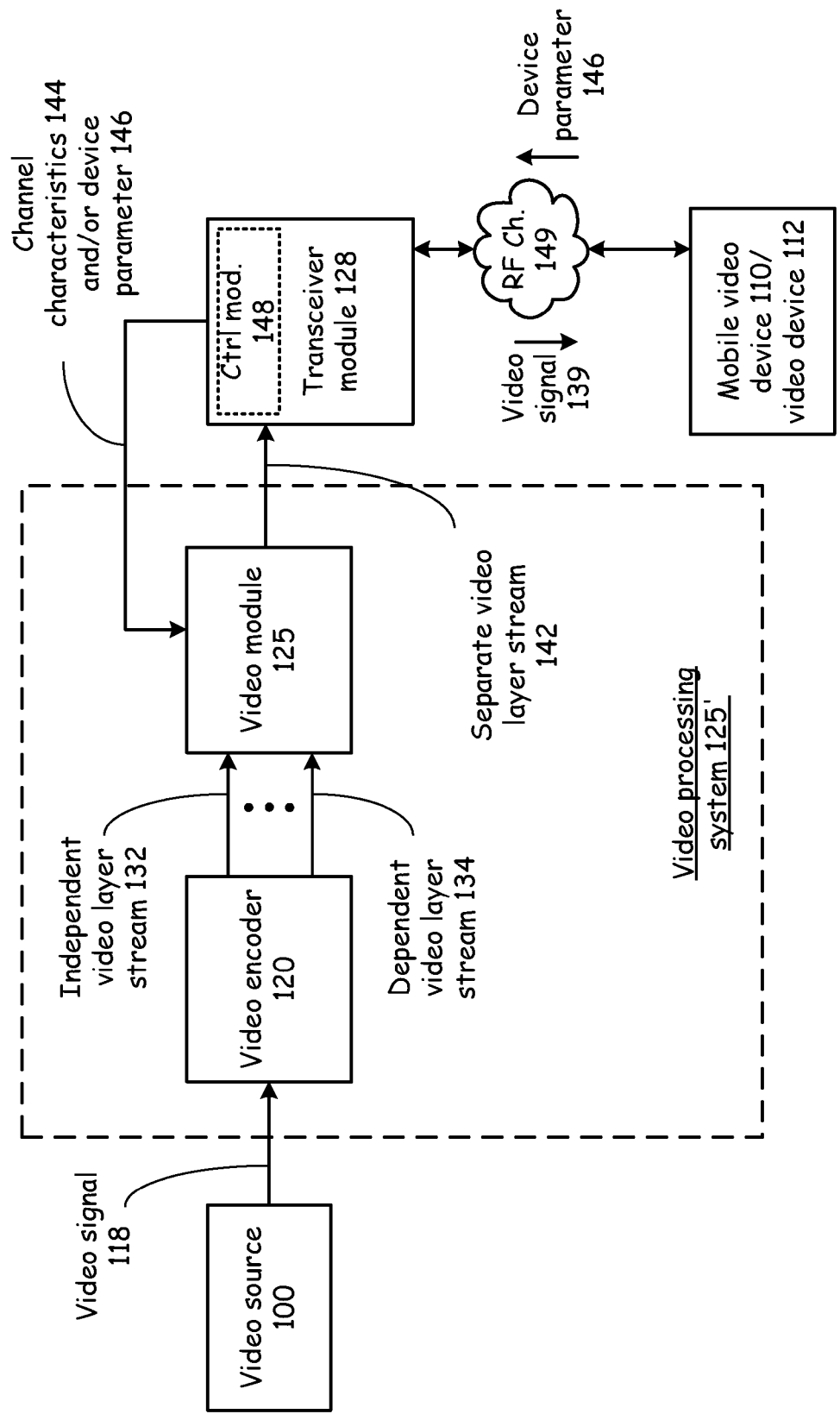

FIG. 7 presents a block diagram representation of a video processing system 125' in accordance with an embodiment of the present invention. In particular video processing system 125' include similar elements from video processing system 125 that are referred to by common reference numerals. In this embodiment, a video module 125 is included that operates in different modes of operation, to pass the independent video layer stream 132 and optionally one or more of the dependent video layer streams 134 to form at least one separate video layer stream 142. In particular video module 125 can pass only the independent video layer stream 132, the independent video layer stream 132 and all of the dependent video layer streams 134 or the independent video layer stream 132 and only selected ones of the dependent video layer streams 134. Channel characteristics 144 and/or device parameter 146 are used by video module 125 to select a mode of video module 125 so that only the independent video layer stream 132 and the necessary dependent video layer streams 134 are sent via transceiver module 128 to mobile video device 110/video device 112. Video module 125 and transceiver module 128 can be included in wireless access device 104. Video module 125 could alternatively be implemented upstream of wireless access device 104 in network 102.

In an embodiment of the present invention, transceiver module 128 transmits a video signal 139 to a remote device, such as mobile video device 110 or video device 112 over at least one RF channel 149 wherein the video signal 139 is transmitted as at least one separate video layer stream 142 chosen from, an independent video layer stream 132 and among the one or more dependent video layer streams 134. Control module 148, coupled to the transceiver module 128 determines at least one channel characteristic 144 of the at least one RF channel 149 and chooses the at least one separate video layer stream 142 based on the at least one channel characteristic of the at least one RF channel 149.

The channel characteristic 144 can be a bit error rate, packet error rate, signal to noise ratio, signal strength, signal to noise and interference ratio, throughput, packet retransmission rate, a reception parameter or other metric that describes the ability of RF channel to effectively send the video signal 139 to the mobile video device 110 or video device 112. In an embodiment of the present invention, the control module 148 chooses the independent video layer stream 132 as the at least one separate video stream when the at least one channel characteristic 144 compares unfavorably to a threshold, transmitting only this reduced signal when the channel characteristics call for such an approach. Further, the control module 148 can choose the independent video layer stream and each of the at least one dependent video layer streams as the at least one separate video stream when the at least one channel characteristic compares favorably to a threshold and full scale, resolution, et cetera. video can be effectively received.

In addition, the control module 148 can select transmission parameters for transmitting the video signal 149 based on the at least one channel characteristic 144 and wherein the transceiver module 128 transmits the video signal 149 based on the selected transmission parameters. In this fashion, the transceiver module 128 can adjust transmission parameters such as modulation spectral densities, data rate, forward error correction code to compensate for reduced throughput.

For example, under challenging channel conditions and reduced throughput, the video module 125, based on channel characteristic 144, can switch to decoding only the independent video layer stream 132 and use a lower data rate and greater forward error correcting coding to protect this lower frame rate, lower resolution, or otherwise reduced signal. In a further example wherein the transceiver module 128 includes a multi-input multi-output (MIMO) transceiver, and the at least one RF channel 149 includes a plurality of MIMO channels, The transceiver module 128 can adjust transmission parameters including adjusting a selected subset of the plurality of MIMO channels used to transmit the independent video layer stream. In this fashion, the transceiver 128 can assign additional transceiver channels to increase the probability that the independent video layer stream 132 will be correctly received—since this video layer is required for decoding.

In addition, the control module 148 can select transmission parameters for transceiver module 128 further based on the at least one separate video layer stream 142 that was chosen. Knowing the bandwidth required and particular signals to be transmitted, based on the control module's own analysis of the channel characteristics 144, can help the control module 148 select and/or assign MIMO channels, modulation spectral densities, data rate, forward error correction code and other transmission parameters.

In a further embodiment of the present invention, transceiver module 128 receives a device parameter 146 from a remote device, such as the mobile video device 110 or video device 112 and transmits video signal 139 as at least one separate video layer stream 142 chosen from, independent video layer stream 132 and one or more dependent video layer streams 134. Control module 148 chooses the at least one separate video layer stream 142 based on the device parameter 146. In this fashion, control module 146 chooses the independent video layer stream and only those dependent video layer streams for decoding and transmission that are required based on the characteristics and state of the mobile video device 110 or video device 112.

For example, the device parameter 146 can include a device resolution and the control module can choose the independent video layer stream 132 for transmission as the at least one separate video stream 142 when the device resolution corresponds to a first resolution. In addition, the control module 248 can choose the independent video layer stream 122 and each of the at least one dependent video layer streams 134 for transmission as the at least one separate video stream 142 when the device resolution corresponds to a second resolution that is higher than the first resolution.

In a further example, the device parameter 146 can include a power state of the remote device. The control module can choose the independent video layer stream 132 for transmission as the at least one separate video stream 142 when the power state corresponds to a first power state, such as a low power state. Further, the control module 148 can choose the independent video layer stream 132 and each of the at least one dependent video layer streams 134 for transmission as the at least one separate video stream 142 when the power state corresponds to a second power state that is higher than the first power state.

Figure 8:
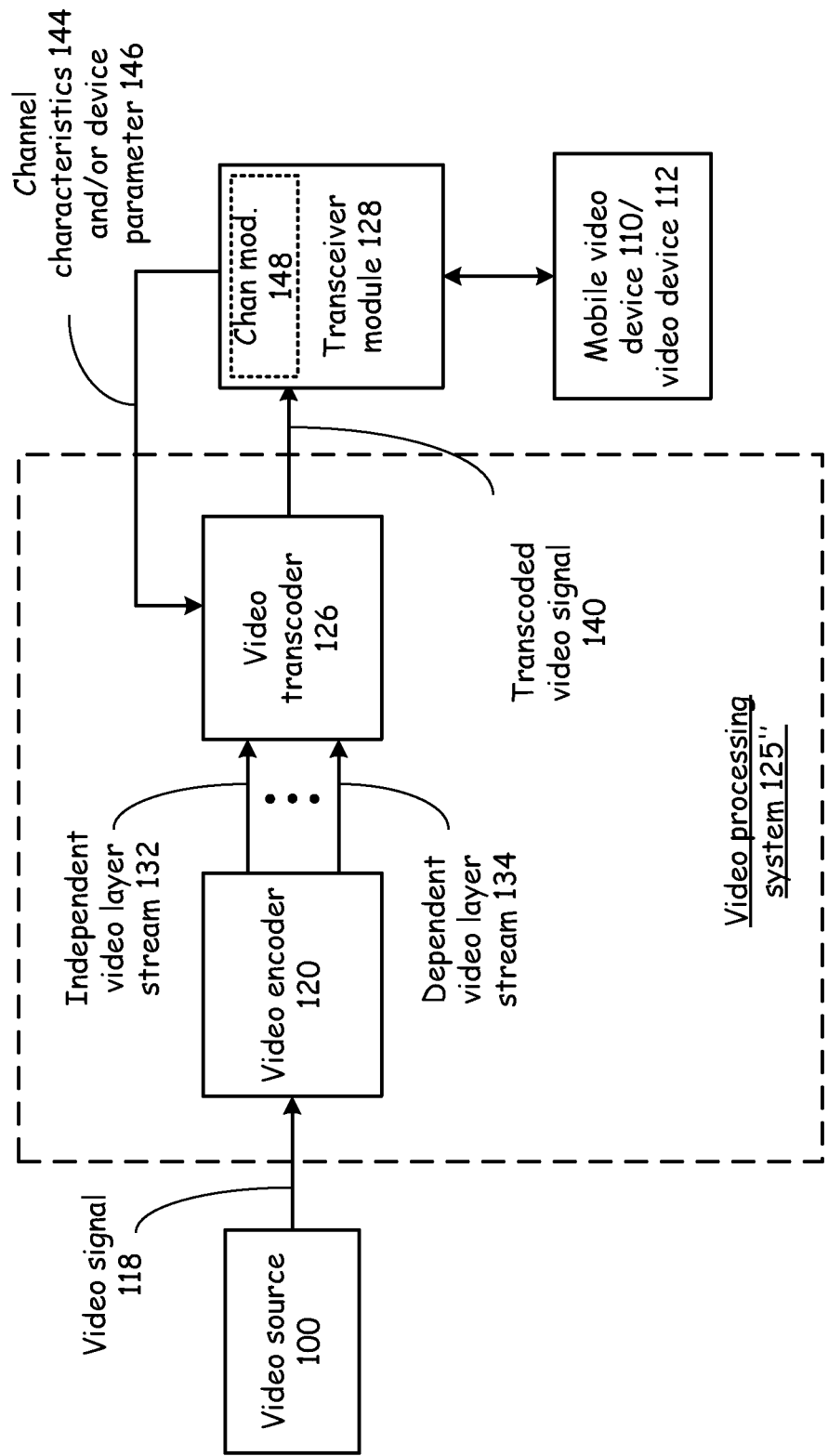

Video module 125 can be implemented in hardware, software or firmware. In particular embodiments, the video module 125 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video module 125 is implemented with two or more devices, each device can perform the same steps, processes or functions in order to provide fault tolerance or redundancy. Alternatively, the function, steps and processes performed by video module 125 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video module 125 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry FIG. 8 presents a block diagram representation of a video processing system 125" in accordance with an embodiment of the present invention. Video processing system includes several similar elements to the system of FIG. 7 that are referred to by common reference numerals. In this embodiment of the present invention, video transcoder 126 operates based on channel characteristics 144 and/or device parameter 146 to generate a single transcoded video signal 140 that is based on the characteristics and/or state of the mobile vide device 110 or video device 112. In particular, video transcoder 126, like video module 125, can pass the independent video layer stream 132 alone as transcoded video signal 140. In addition, video transcoder module 126 can synchronize and combine the independent video layer stream 132 with one or more of the dependent video layer streams 134 to form transcoded video signal 140. In circumstances where the final resolution, color scale, frame rate, digital format, et cetera of the mobile video device 110 or video device 112, either based on the current state of the device or based on the characteristics of the device, differ from each of the possible resolutions, scales, frame rates available by combinations of the different dependent video layer streams 134, video transcoder 126 can generate at least a portion of the video signal by a transcoding to match the desired color scale, resolution, frame rate digital format, et cetera of the mobile video device 110 or video device 112 or to adapt to its current state, such as its current power state.

In an embodiment of the present invention, video transcoder 126 receives independent video layer stream 132 and one or more dependent video layer streams 134. The video transcoder 126 generates a transcoded video signal 140 based the independent video stream alone and optionally including one or more of the dependent video layer streams 134. Transcoder 126 can perform a course level of transcoding by choosing from which of the video layer streams to synchronize and combine. A transcoded video signal 140 can be produced with full, partially reduced or fully reduced scale, resolution, frame rate, motion vector resolution, color, et cetera, based on the selection of which if any of the dependent video layer streams 134 to synchronize and combine with the independent video layer stream 132.

Video transcoder 126 synchronizes the independent video layer stream 132 and the chosen ones of the dependent video layer streams 134 to form a single synchronized stream and combines the synchronized stream to generate the transcoded video signal 140. Optionally, the video transcoder 140 can perform additional fine transcoding by further transcoding (such as by decoding and re-encoding the combined video signal) to a particular frame rate, resolution, color scale, et cetera or to match a different digital format. In this fashion, when independent video layer stream 132 has been encoded in one digital format, such as an MPEG-2 format, transcoded video signal 140 can be transcoded into another digital format such as an H.264 format and/or can be modified in terms of frame rate, resolution, color scale, et cetera based on which, if any, of the dependent video layer streams 134 are included in the transcoding and also with optionally additional fine transcoding to produce a frame rate, resolution, color scale, et cetera that was not otherwise available based on the any combinations of the dependent layer video streams 134.

For example, in one mode of operation, the video transcoder 126 synchronizes and combines the independent video layer stream 132 and one dependent video layer stream 134 to generate the transcoded video signal 140. In a second mode of operation, the video transcoder 126 synchronizes and combines the independent video layer stream 132 and one dependent video layer stream 134 to form a synchronized video signal and further transcodes the synchronized video signal to generate the transcoded video signal 140. In another mode of operation, the video transcoder 126 generates the transcoded video signal 140 from the independent video layer stream 132 without any of the dependent video layer streams 134. In a further mode of operation, the video transcoder 126 generates the transcoded video signal 140 by transcoding the independent video layer stream 132. These examples are merely illustrative of the many combinations of transcoding possible by video transcoder 126 in accordance with the present invention.

Figure 9:
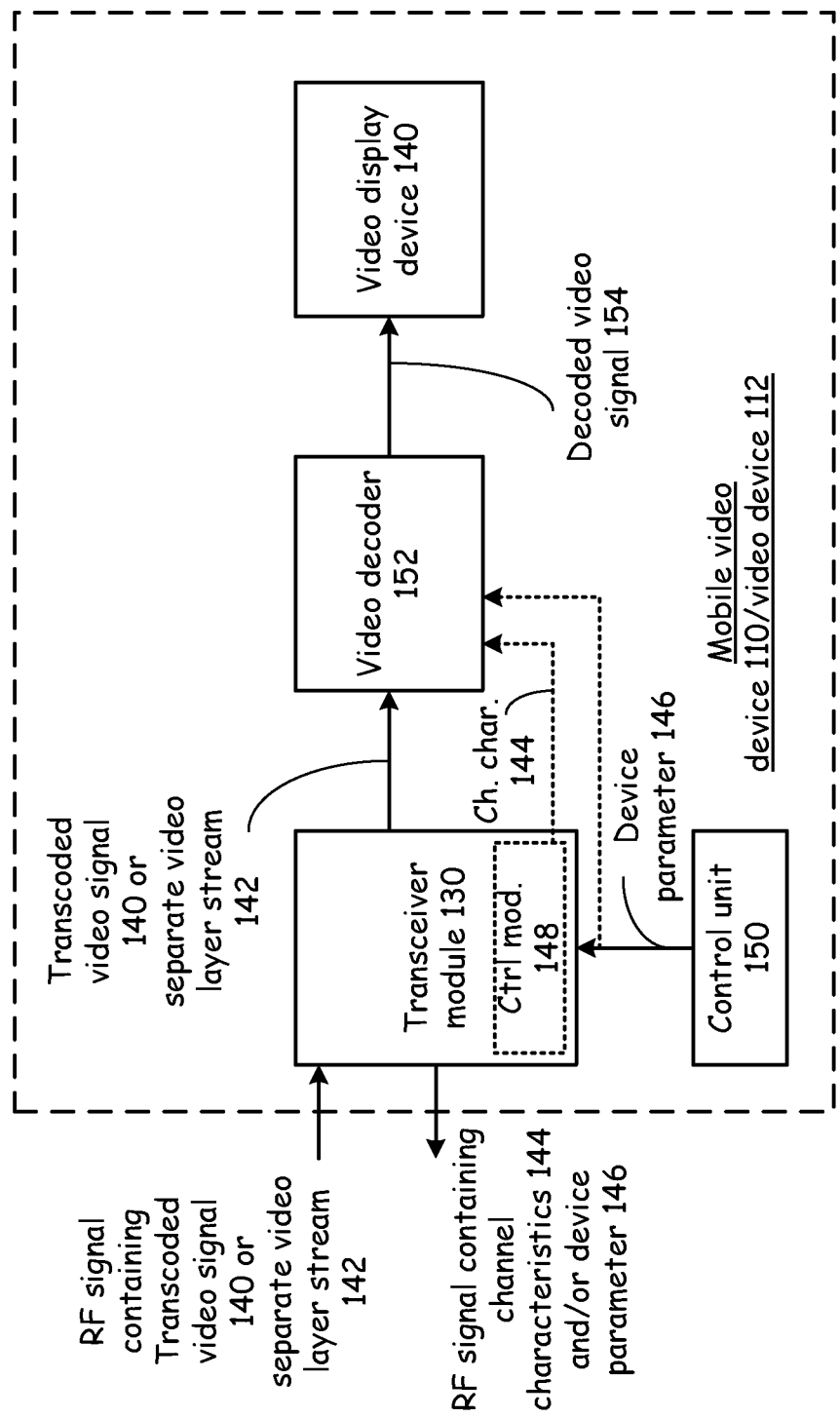

Video transcoder 126 can be implemented in hardware, software or firmware. In particular embodiments, the video transcoder 126 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video transcoder 126 is implemented with two or more devices, each device can perform the same steps, processes or functions in order to provide fault tolerance or redundancy. Alternatively, the function, steps and processes performed by video transcoder 126 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video transcoder 126 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry FIG. 9 presents a block diagram representation of a mobile video device 110/video device 112 in accordance with an embodiment of the present invention. In particular, a mobile video device 110 or 112 is shown that includes similar elements discussed in conjunction with FIG. 3. However, in this embodiment, the transceiver module 130 transmits device parameter 146 from control unit 140 and/or locally generated channel characteristics 144 from channel module 148 to enable wireless access device 104, such as a base station or access point, to transmit an RF signal containing either a transcoded video signal 140 or one or more separate video layer streams that have been adjusted based on the characteristics and/or state of the mobile video device 110 or 112.

In an embodiment where transceiver module 130 receives an RF signal containing transcoded video signal 140 that is generated to match the format expected by mobile video device 110/video device 112, video decoder 152 can include a standard video decoder that decodes the transcoded video signal 140 to generate decoded video signal 154. Alternatively, where mobile video device 110/video device 112 expects that it can received a transcoded signal 140 that has been adapted to the channel characteristics or based on its own device state, for instance, video decoder 152, is capable of decoding transcoded video signal 140 in various formats. In a particular embodiment, the transcoded video signal 140 is generated by video transcoder 126 to include one or more control bits that identify the particular video format, frame rate, color scale, and/or resolution, et cetera so that the transcoded video signal 140 can be correctly decoded. In an alternative embodiment, video decoder 152 receives device parameter 146 and/or channel characteristics 144 and determines a particular decoding mode, based on this input.

In a further embodiment of the present invention, the video decoder receives separate video layer stream 142 that, based on the characteristics of the mobile video device 110 or video device 112 be only a single layer, the independent video layer stream 132. In this case, a standard video decoder can be employed. However, to the extent that the one or more separate video layer stream 142 includes independent video layer stream 132 and also one or more dependent video layer streams 134, video decoder operates as video decoder 136 to create a single decoded video signal 138, 138' or 138" from the one or more separate video layer streams 142.

Video decoder 152 can be implemented in hardware, software or firmware. In particular embodiments, the video decoder 152 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video decoder 152 is implemented with two or more devices, each device can perform the same steps, processes or functions in order to provide fault tolerance or redundancy. Alternatively, the function, steps and processes performed by video decoder 152 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video decoder 152 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Figure 10:
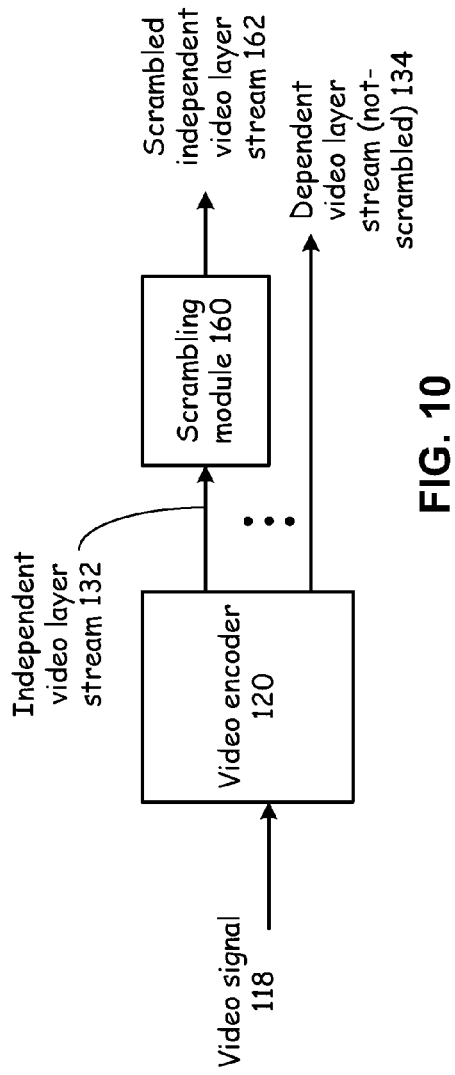

FIG. 10 presents a block diagram representation of a scrambling module 160 in accordance with an embodiment of the present invention. In particular, a scrambling module 160 is shown in conjunction with video encoder 120 that has been previously discussed, that can be used in conjunction with video encoder 120 in implementations where the scrambling of video signals is desirable for digital rights management, security or other reasons. Scrambling module 160 scrambles the independent video layer stream 132 to produce a scrambled independent video layer stream 162 and leaves the one or more dependent video layer streams 134 unscrambled. Since the dependent video layer streams 134 cannot be meaningfully decoded without reference to the independent video layer stream 132 from which they depend, these additional video streams need not be scrambled. Scrambling only the independent video layer stream 132 saves on computation, and reduces the complexity of implementation of video processing system 125, 125', 125", et cetera. In addition, by encrypting only one layer, a system can increase the frequency that keys are updated and/or apply greater key buffering to create a more robust design.

In an embodiment of the present invention, scrambling module 160 operates by encrypting the independent video layer stream 132 using an encryption algorithm such as a key-based encryption algorithm; however, other scrambling and/or encryption techniques can likewise be used in accordance with the present invention.

Scrambling module 160 can be implemented in hardware, software or firmware. In particular embodiments, the scrambling module 160 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When scrambling module 160 is implemented with two or more devices, each device can perform the same steps, processes or functions in order to provide fault tolerance or redundancy. Alternatively, the function, steps and processes performed by scrambling module 160 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the scrambling module 160 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Figure 11:
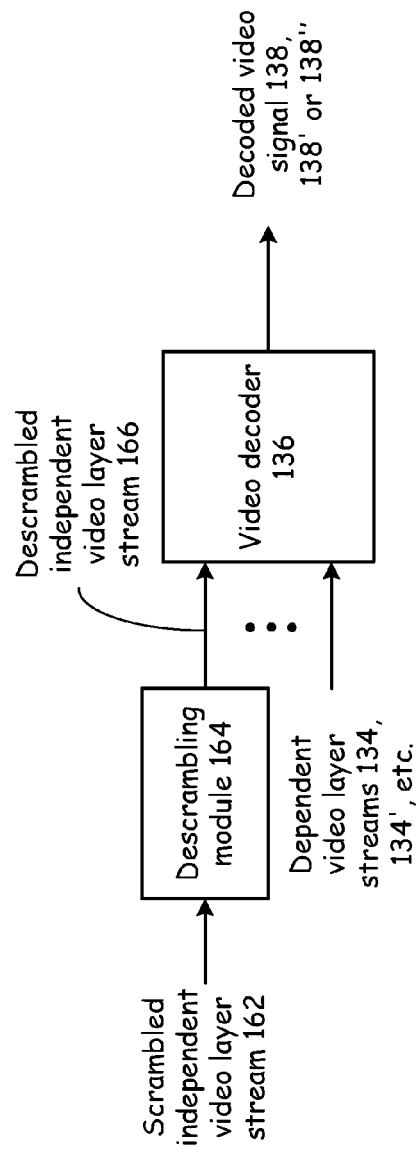

FIG. 11 presents a block diagram representation of a descrambling module 164 in accordance with an embodiment of the present invention. In particular, descrambling module 164 is coupled to receive the scrambled independent video layer stream 162 and operates to descramble the scrambled independent video layer stream 162, based on the particular scrambling technique employed, to produce a descrambled independent video layer stream 166. Video decoder 136 operates on the descrambled independent video layer stream 166 as if it were the original independent video layer stream 132, and operates as previously discussed to generate a reconstructed video signal such as decoded video signal 138, 138', 138", et cetera.

Descrambling module 164 can be implemented in hardware, software or firmware. In particular embodiments, the descrambling module 164 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When descrambling module 164 is implemented with two or more devices, each device can perform the same steps, processes or functions in order to provide fault tolerance or redundancy. Alternatively, the function, steps and processes performed by descrambling module 164 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the descrambling module 164 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

While the systems of FIGS. 10 and 11 have been described in terms of the scrambling of the independent video layer stream 132 while dependent video layer streams 134 are left unscrambled, in an alternative embodiment, the scrambling of layers can be reversed and the independent video layer stream 132 can be unscrambled and one ore all of the dependent video layer streams 134 can be scrambled. This embodiment, among other possible uses, can be used in a system whereby the independent video layer stream 132 is a low resolution signal that is transmitted without restriction, but users require the encryption keys to access the dependent video layer streams that provide enhanced resolution decoding and display. In this fashion, the low resolution signal can be provided on a free basis, while access to greater resolution is provided on a subscription of other fee-basis.

Figure 12:
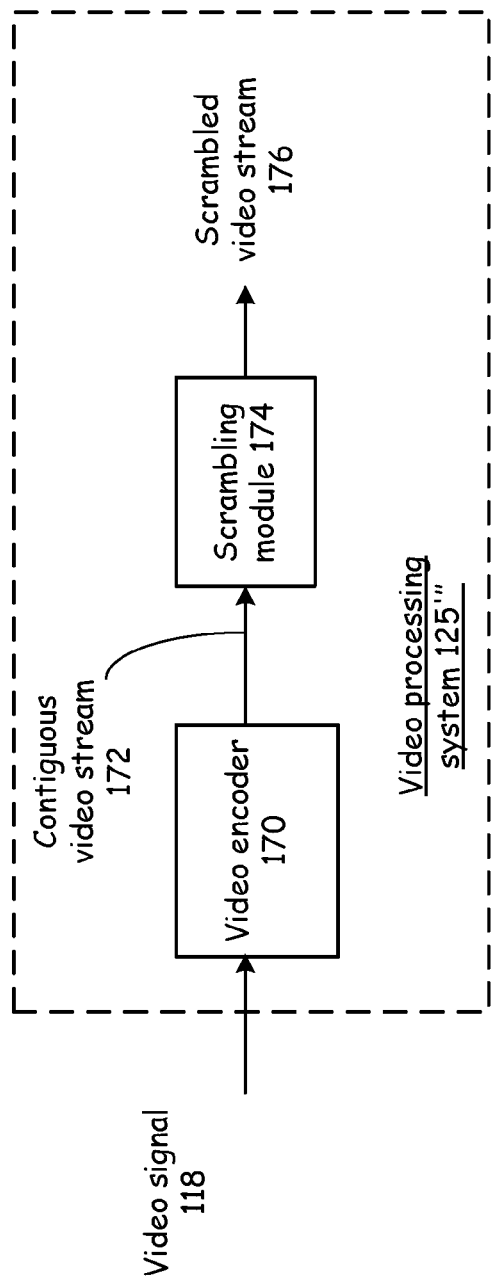

FIG. 12 presents a block diagram representation of a video processing system 125''' in accordance with an embodiment of the present invention. In particular, video processing system 125''' includes a video encoder 170 that encodes a video signal 118 into a contiguous video stream 172 having an independent portion and a dependent portion that requires the independent portion for decoding Scrambling module 174 scrambles the contiguous video stream 172 to produce a scrambled video stream 176 by scrambling the independent video portion and leaving the dependent portion unscrambled. For example, video encoder 170 can encode frames of video signal 118 into I frames, P, frames and B frames, wherein the independent portion of the contiguous video stream 172 includes the I frames and the dependent portion of the contiguous video stream 172 includes the B frames and the P frames. Since the P and B frames require data from the I frames for decoding, scrambling, such as by encrypting, a portion of the contiguous video stream 172 that includes the I frames means that the contiguous video stream 172 cannot be meaningfully decoded without being able to descramble the scrambled data. In an embodiment of the present invention, video encoder 170 implements MPEG-2 video compression, however other encoding techniques that utilize I, P and B frames or similar techniques or that otherwise employ other independent and dependent portions can similarly be scrambled in this fashion in accordance with the present invention to save computation effort in scrambling and descrambling.

In an embodiment of the present invention, the scrambled independent portion of the scrambled video stream 176 includes digital rights management (DRM) data that is scrambled to protect the integrity of this DRM data.

Video encoder 170 and scrambling module 174 can be implemented in hardware, software or firmware. In particular embodiments, the video encoder 170 and scrambling module 174 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video encoder 170 and scrambling module 174 is implemented with two or more devices, each device can perform the same steps, processes or functions in order to provide fault tolerance or redundancy. Alternatively, the function, steps and processes performed by video encoder 170 and scrambling module 174 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video encoder 170 and scrambling module 174 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Figure 13:
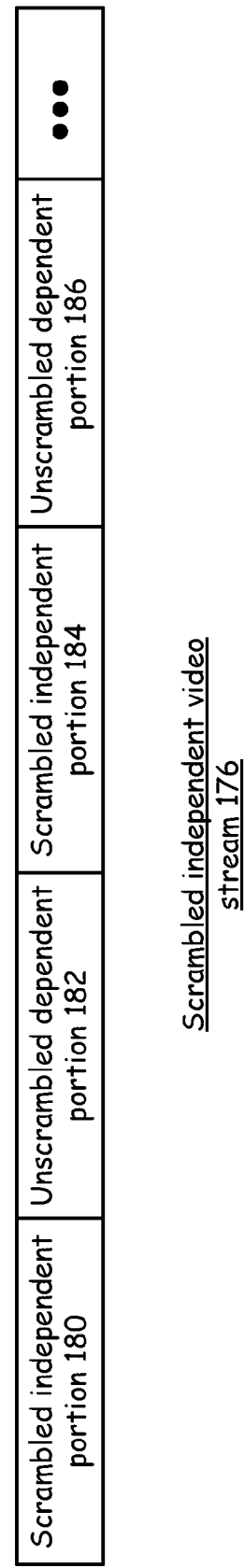

FIG. 13 presents a pictorial representation of a scrambled independent video stream 176 in accordance with an embodiment of the present invention. In particular an example of scrambled independent video stream 176 is shown with scrambled independent portions 180 and 184 and unscrambled dependent portions 182 and 186. In an embodiment of the present invention, the independent and dependent portions are interlaced, however, the dependent and independent portions can be combined to form the scrambled independent video stream in other ways.

Figure 14:
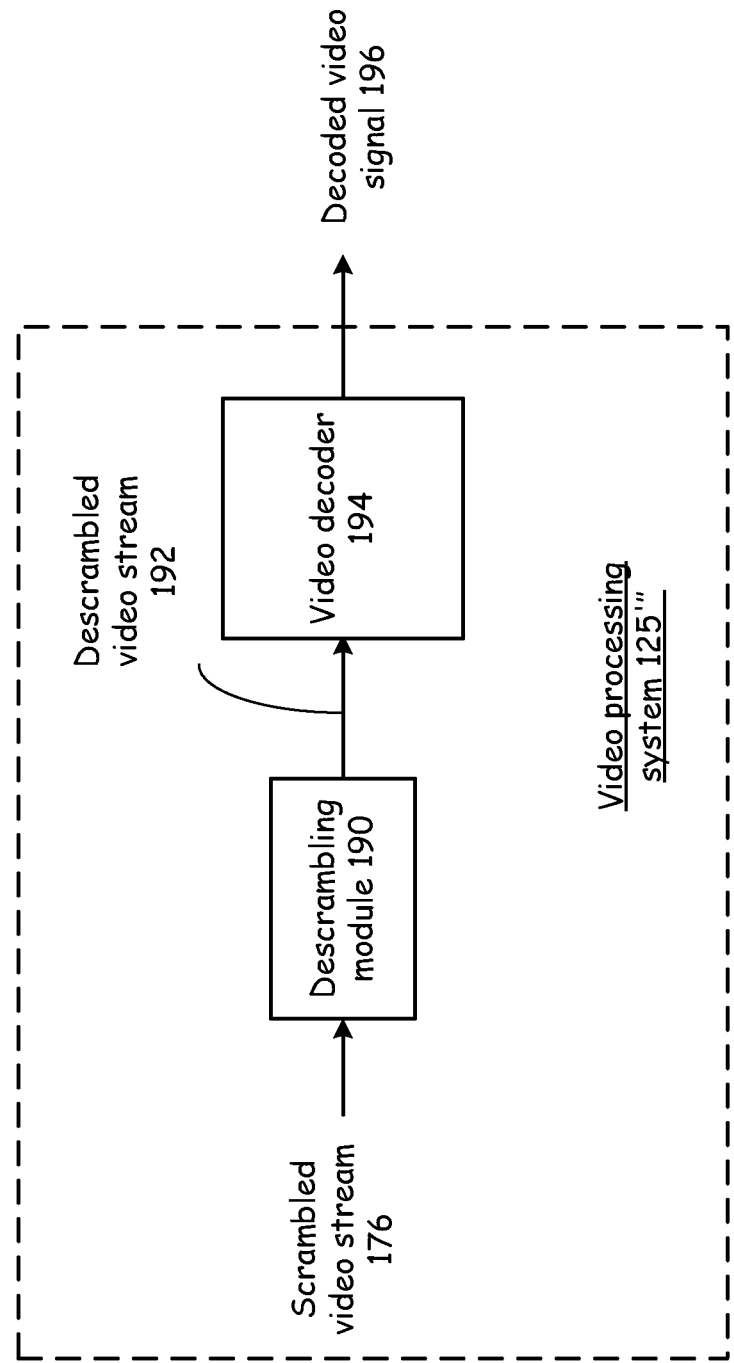

FIG. 14 presents a block diagram representation of a video processing system 125''' in accordance with another embodiment of the present invention. In particular, a further embodiment of video processing system 125''' that includes a descrambling module 190 coupled to receive the scrambled video stream 176 and to produce a descrambled video stream 192 by descrambling the scrambled independent portion. In this fashion, the descrambled video stream can be decoded, via a convention video decoder 194 to produce a decoded video signal 196.

Descrambling module 190 can be implemented in hardware, software or firmware. In particular embodiments, the descrambling module 190 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When descrambling module 190 is implemented with two or more devices, each device can perform the same steps, processes or functions in order to provide fault tolerance or redundancy. Alternatively, the function, steps and processes performed by descrambling module 190 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the descrambling module 190 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Figure 15:
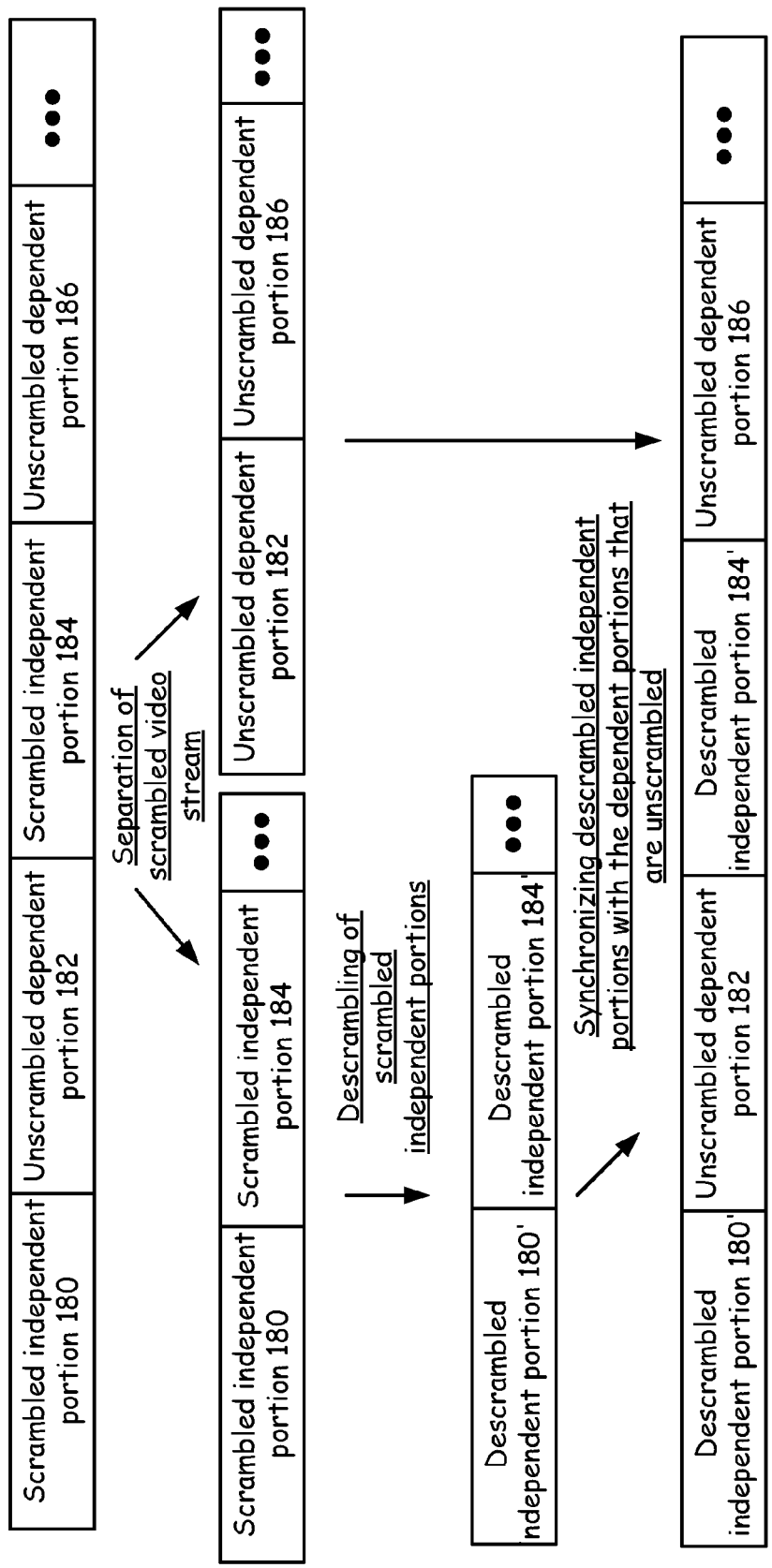

FIG. 15 presents a pictorial representation of a descrambling of a scrambled video stream in accordance with an embodiment of the present invention. In particular, a descrambling module such as descrambling module 190 separates the scrambled independent portions 180, 184, ... of the scrambled video stream 176 from the unscrambled independent portions 182, 186, .... The descrambling module produces descrambled independent portions 180', 184', ... from the scrambled independent portions 180, 184, ..., and produces the descrambled video stream 192 by synchronizing the descrambled independent portions 180', 184', ... with the unscrambled dependent portions 182, 186, ....

Figure 16:
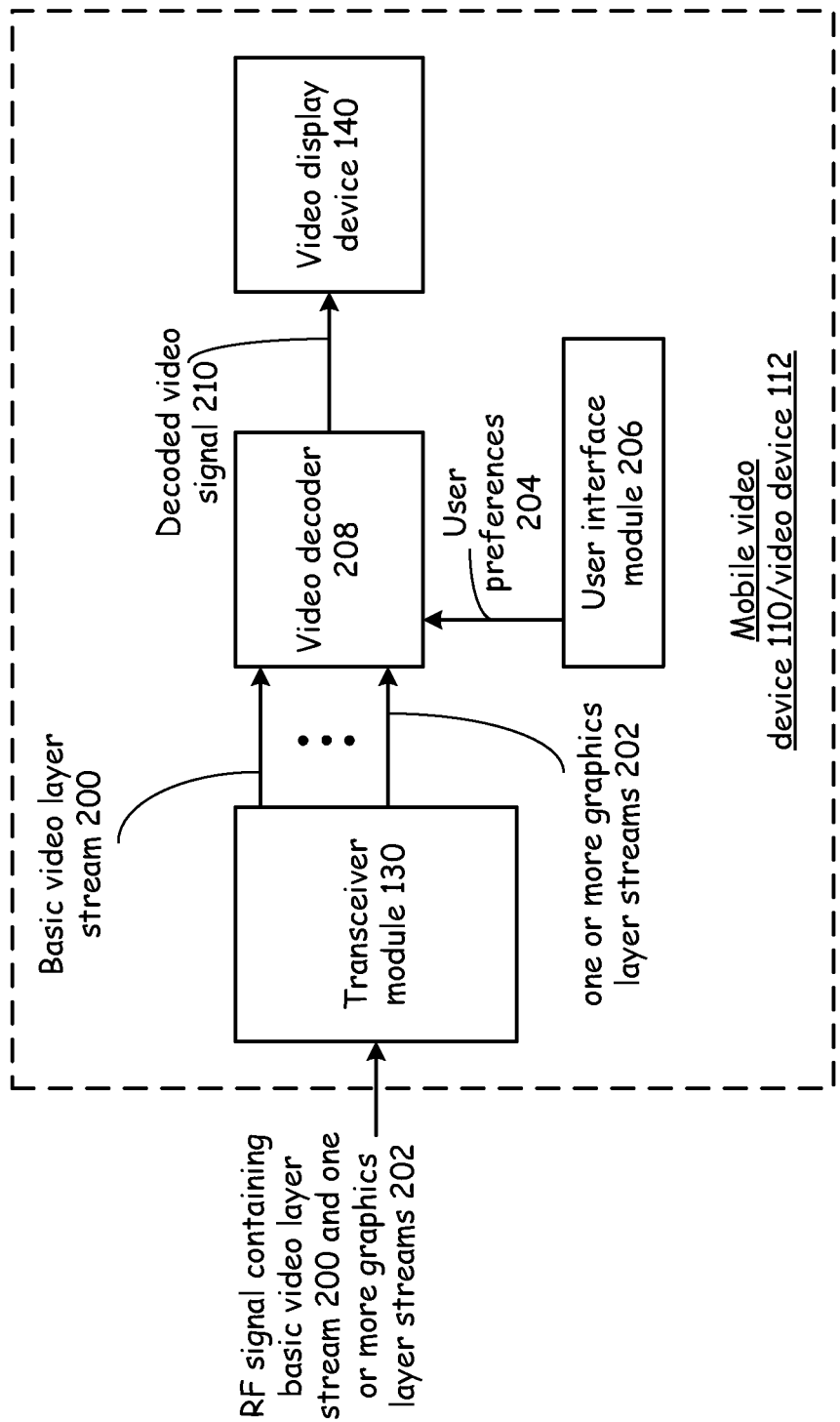

FIG. 16 presents a block diagram representation of a mobile video device 110/video device 112 in accordance with an embodiment of the present invention. In particular a video processing device such as mobile video device 110 or video device 112 includes a user interface module 206 such as a touch screen, remote control device, mouse, thumb wheel, keypad or other interface that receives one or more user preferences. The video processing device includes a transceiver module 130 that receives an RF signal containing a basic video layer stream 200 and one or more graphics layer streams 202. A decoder module, such as video decoder 208 produces a decoded video signal 210 for video display device 140 from a basic video layer stream 200 and at least one graphics layer streams 202 recovered by the transceiver module 130, based on the at least one user preference 204.

In an embodiment of the present invention, the one or more graphics layer streams 202 includes data in accordance with a plurality of presentation options such as graphics overlays, interactive or non-interactive that can be combined with the basic video layer stream 200 to enhance the user experience. The user preferences 204 select at least one of the plurality of presentation options, and wherein the video decoder 208 applies the presentation options in the decoded video signal 210.

For example, a basic video layer stream 200 from a weather channel can include the basic video programming from that channel. In addition, the basic video layer stream 200 is transmitted with one or more additional graphics video layers 202 that contain, for instance, additional weather information such as local temperature, local forecast data that can optionally be displayed in different formats based on the selected presentation option. Further, the one or more graphics video layers 202 can include non-weather related data such as sports scores, financial data such as real-time or near real-time stock process, or other financial news or other breaking news information. This data can be optionally selected for display and be displayed in a selected format, font, color scheme or portion of the display screen based on the user preferences 204.

In an embodiment of the present invention, the basic video layer stream 200 and at least one graphics layer streams correspond to a video program such as a movie, or television program. The video decoder 208 stores the user preferences 204 when the video program is decoded a first time and applies the presentation options when the video program is decoded a second time, subsequent to the first time. In this fashion, one a set of user preferences 204 have been selected for a particular video program, the presentation options associated with these user preferences 204 can be applied each time the particular video program is viewed, unless cancelled or deleted.

Further the user preferences 204 can optionally be applied to select presentation options when another video program is decoded that has one or more of the same presentation options. For instance, if the user selects to run sports scores in the top right corner of his screen when watching a football game. If a basketball game is transmitted with a graphics video layer that includes this presentation option, the video decoder 208 can automatically apply these options, based on the stored user preferences 204, unless and until cancelled or erased by the user.

Similarly the user may elect to turn off all graphics layers, turn on all graphics layers, for instance adding sports scores, weather, news and program specific graphics to each viewed program, based on the selection of particular user preferences 204. For instance, video decoder 208 can produce the decoded video signal 210 from the basic video layer stream 200 and not any of the graphics layer streams 202 when the user preferences 204 includes a first data value. Further, video decoder 208 can produce the decoded video signal 210 from the basic video layer stream 200 and any or all of the graphics layer streams 202 when the user preferences 204 includes a second data value.

In operation, the video decoder 208 synchronizes and combines the basic video layer stream 200 and one or more graphics layer streams 204 and decodes the synchronized stream to for decoded video signal 210. It should be noted that the user interface module 206 can receive the user preferences 204 during a set-up of the video processing device or during the production of the decoded video signal 210 that contains a particular basic video layer stream 200 and one or more graphics layer streams 202 for which the user preferences are desired to be applied.

It should be noted that basic video layer stream 200 and one or more graphics layer streams 202 provide additional examples of independent video layer stream 132 and one or more dependent video layer streams 134 and the many functions and features of the present invention described in conjunction with FIGS. 1-16 could likewise be applied to this additional video layering technique.

Video decoder 208 can be implemented in hardware, software or firmware. In particular embodiments, the video decoder 208 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video decoder 208 is implemented with two or more devices, each device can perform the same steps, processes or functions in order to provide fault tolerance or redundancy. Alternatively, the function, steps and processes performed by video decoder 208 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video decoder 208 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

FIG. 17 presents a pictorial representation of graphics displays in accordance with an embodiment of the present invention. In particular, basic video display 220 presents an example display from mobile video device 110/video device 112 resulting from the decoding of a basic video layer stream 200. Basic video with enhanced graphics overlay 222 is an example display resulting from the decoding of the same basic video layer stream 200 along with a graphics layer stream containing a plurality of presentation options for displaying weather information, such as temperature. In this example 222, the user has set user preferences 204 to display the current temperature at the bottom of the display screen in a banner portion in degrees Celsius, either during an initial set-up of the mobile video device 110/video device 112 or due to a default setting of user preferences 204. In an embodiment of the present invention, this presentation option is applied whenever this particular video program or channel is viewed by the user of mobile video device 110/video device 112. In addition, this, this presentation option is applied whenever another video program or channel is viewed by the user of mobile video device 110/video device 112 that contains this presentation option in an accompanying graphics layer stream.

FIG. 18 presents another pictorial representation of a graphics display in accordance with an embodiment of the present invention. In particular, basic video with enhanced graphics overlay 222' is an example display resulting from the decoding of the same basic video layer stream 200 along with a graphics layer stream containing a plurality of presentation options for displaying weather information such as temperature. In this example 222', the user has set user preferences 204 to display the current temperature (or modify the display of the current temperature) at the bottom of the display screen in a banner portion in degrees Fahrenheit, during the display of the basic video 220. One or more graphics layer streams 202 optionally contain various banner configurations and data in various formats that can be selected for decoding. In this case, local temperature data in both degrees C. and degrees F. is included in the one or more graphics layer streams 202 for selection by the user.

As in the example presented in conjunction with FIG. 17, this presentation option is applied whenever this particular video program or channel is viewed by the user of mobile video device 110/video device 112. In addition, this presentation option is applied whenever another video program or channel is viewed by the user of mobile video device 110/video device 112 that contains this presentation option in an accompanying graphics layer stream.

FIG. 19 is a flowchart representation of a method in accordance with the present invention. In particular, a method is presented for use with one or more of the functions and features presented in conjunction with FIGS. 1-18. In step 400, a video stream is encoded into a independent video layer stream and a first dependent video layer stream based on a plurality of motion vectors, wherein the independent video layer stream includes a first plurality of motion vector data corresponding to the plurality of motion vectors, the first plurality of motion vector data representing a plurality of most significant bits of each of the plurality of motion vectors, wherein the first dependent video layer stream includes a second plurality of motion vector data corresponding to the plurality of motion vectors, the second plurality of motion vector data representing a plurality of least significant bits of each of the plurality of motion vectors, and wherein the first dependent video layer stream does not include the first plurality of motion vector data.

In an embodiment of the present invention, the first plurality of motion vector data includes an integer portion for each of the plurality of motion vectors and the second plurality of motion vector data includes a fractional portion for each of the plurality of motion vectors. Decoding of the first dependent video layer stream can be dependent on data from the independent video layer stream. Step 400 further encode the video stream into a second dependent video layer stream, wherein the second dependent video layer stream includes a third plurality of motion vector data corresponding to the plurality of motion vectors, and wherein the second dependent video layer stream does not include the first plurality of motion vector data and does not include the second plurality of motion vector data.

FIG. 20 is a flowchart representation of a method in accordance with the present invention. In particular, a method is presented for use with one or more of the functions and features presented in conjunction with FIGS. 1-19. In step 405, a video stream is encoded into a independent video layer stream and a first dependent video layer stream, wherein the independent video layer stream includes a plurality of grayscale data, wherein the first dependent video layer stream includes a plurality of color data, and wherein the first dependent video layer stream does not include the plurality of grayscale data.

In an embodiment of the present invention, the independent video layer stream does not include the plurality of color data. Decoding of the first dependent video layer stream can be dependent on data from the independent video layer stream. The grayscale data can include luma data and the color data can include chroma data.

Figure 21:
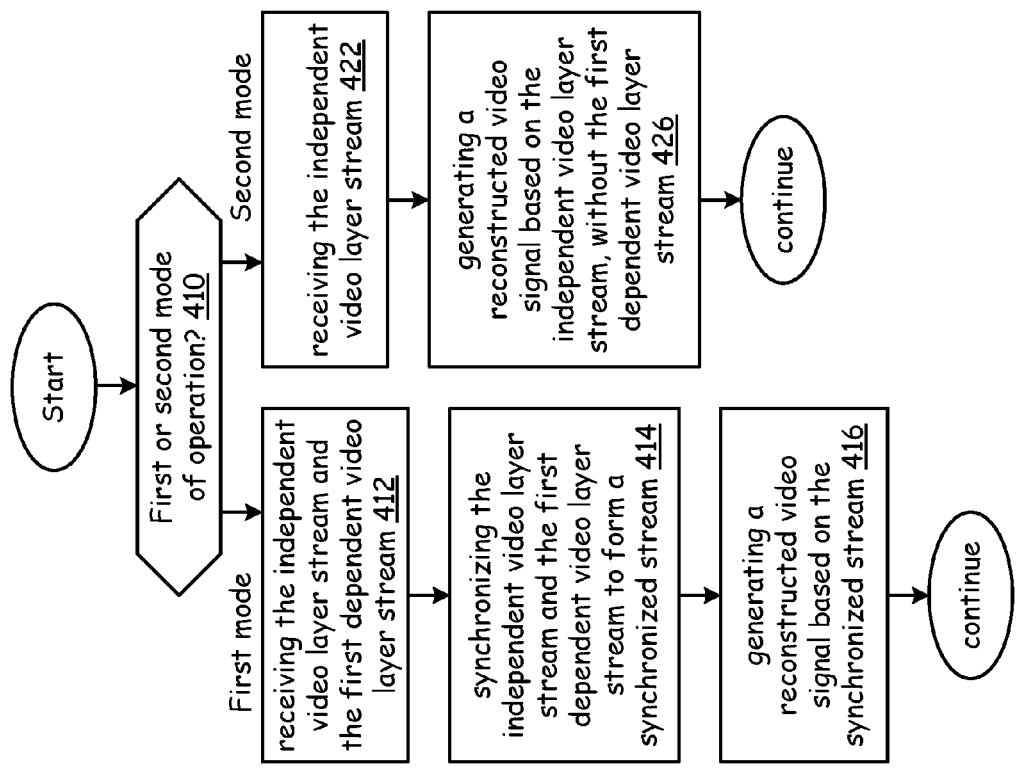
FIG. 21 is a flowchart representation of a method in accordance with the present invention.

FIG. 21 is a flowchart representation of a method in accordance with the present invention. In particular, a method is presented for use with one or more of the functions and features presented in conjunction with FIGS. 1-20. In step 410 the method determines if a device or method is in a first or second mode of operation. When in a first mode of operation, the method proceeds to step 412 of receiving the independent video layer stream and the first dependent video layer stream. In step 414, the independent video layer stream and the first dependent video layer stream are synchronized to form a synchronized stream. In step 416, a reconstructed video signal is generated based on the synchronized stream.

When in a second mode of operation, the method proceeds to step 422 of receiving the independent video layer stream. In step 426, a reconstructed video signal is generated based on the independent video layer stream, without the first dependent video layer stream.

FIG. 22 is a flowchart representation of a method in accordance with the present invention. In particular, a method is presented for use with one or more of the functions and features presented in conjunction with FIGS. 1-21. Step 420 includes receiving an independent video layer stream and at least one dependent video layer streams that require the independent video layer for decoding. In step 422, a decoded video signal is generated from at least one separate video stream chosen, based on the device parameter, from the independent video layer stream and at least one dependent video layer streams.

In an embodiment of the present invention, the device parameter includes a device resolution. The at least one separate video layer stream can be chosen as the at least one separate video stream when the device resolution corresponds to a first resolution. The at least one separate video layer stream and each of the at least one dependent video layer streams can be chosen as the at least one separate video stream when the device resolution corresponds to a second resolution that is higher than the first resolution.

Further, the device parameter can include a power state of the remote device choosing the at least one separate video layer stream can choose the independent video layer stream as the at least one separate video stream when the power states corresponds to a first power state. In addition, choosing the at least one separate video layer stream can choose the independent video layer stream and each of the at least one dependent video layer streams as the at least one separate video stream when the power states corresponds to a second power state that is higher than the first power state. Also, step 422 can include synchronizing the independent video layer stream and at least one dependent video layer streams.

FIG. 23 is a flowchart representation of a method in accordance with the present invention. In particular, a method is presented for use with one or more of the functions and features presented in conjunction with FIGS. 1-22. In step 430, a video signal is transmitted to a remote device over at least one RF communications channel wherein the video signal is transmitted as at least one separate video layer stream chosen from, an independent video layer stream and at least one dependent video layer streams that require the independent video layer for decoding. In step 432, at least one channel characteristic of the at least one RF channel is determined. In step 434 the at least one separate video layer stream is chosen based on the at least one channel characteristic of the at least one RF channel.

In an embodiment of the present invention choosing the at least one separate video layer stream includes choosing the independent video layer stream as the at least one separate video stream when the at least one channel characteristic compares unfavorably to a threshold. Further, choosing the at least one separate video layer stream can include choosing the independent video layer stream and each of the at least one dependent video layer streams as the at least one separate video stream when the at least one channel characteristic compares favorably to a threshold. Also, the least one channel characteristic can include a signal to noise ratio, a received signal strength, a bit error rate, a packet retransmission rate, a reception parameter received from the remote device.

Figure 24:
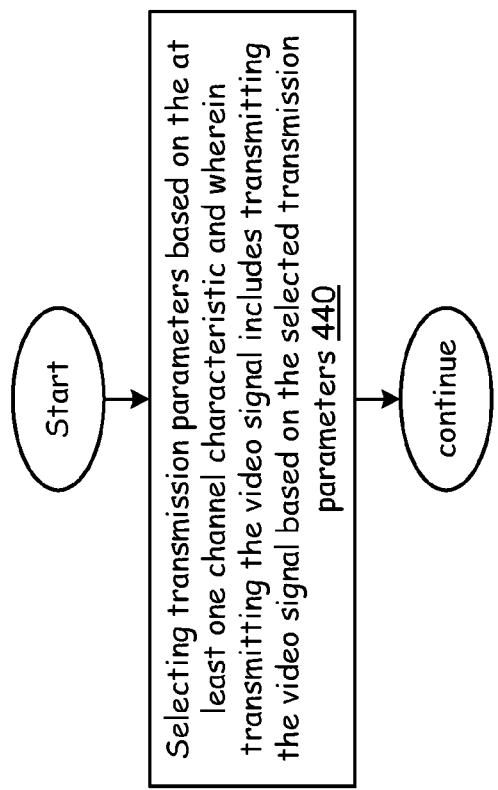
FIG. 24 is a flowchart representation of a method in accordance with the present invention.

FIG. 24 is a flowchart representation of a method in accordance with the present invention. In particular, a method is presented for use with one or more of the functions and features presented in conjunction with FIGS. 1-23. In step 440, transmission parameters are selected based on the at least one channel characteristic, wherein transmitting the video signal includes transmitting the video signal based on the selected transmission parameters.

In an embodiment of the present invention, the transmission parameters include modulation spectral densities, a data rate and/or a forward error correction code. The at least one separate video layer stream can includes the independent video layer stream, wherein the at least one RF channel includes a plurality of multi-input multi-output (MIMO) channels, and wherein the transmission parameters include a selected subset of the plurality of MIMO channels used to transmit the independent video layer stream. Step 440 can include selecting the transmission parameters further based on the at least one separate video layer stream that was chosen.

Figure 25:
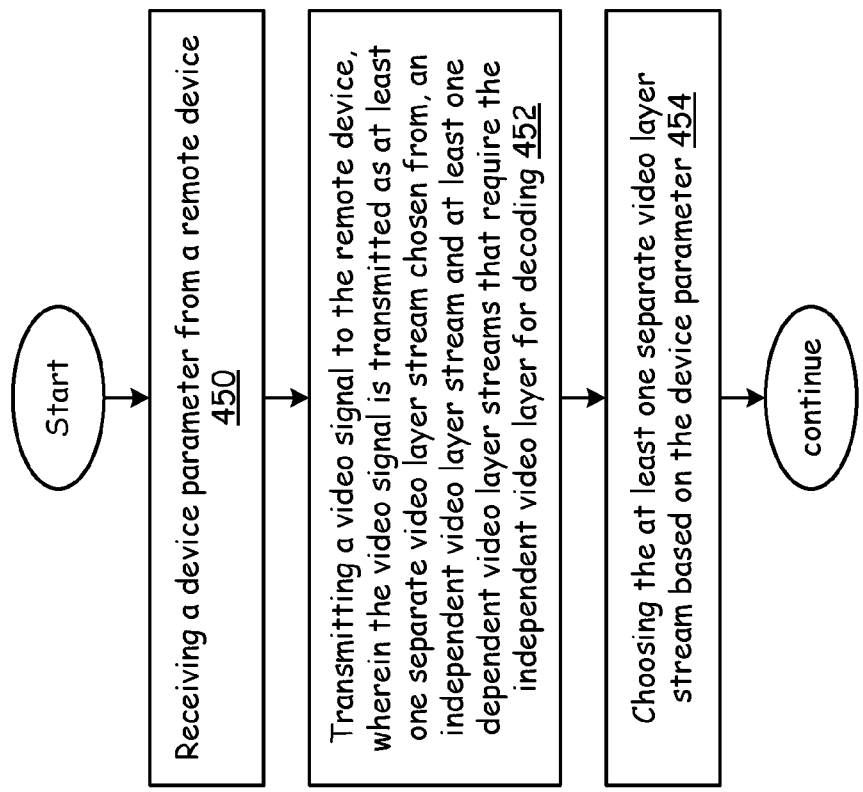
FIG. 25 is a flowchart representation of a method in accordance with the present invention.

FIG. 25 is a flowchart representation of a method in accordance with the present invention. In particular, a method is presented for use with one or more of the functions and features presented in conjunction with FIGS. 1-24. In step 450, a device parameter is received from a remote device. In step 452, a video signal is transmitted to the remote device, wherein the video signal is transmitted as at least one separate video layer stream chosen from, an independent video layer stream and at least one dependent video layer streams that require the independent video layer for decoding. In step 454, the at least one separate video layer stream is chosen based on the device parameter.

In an embodiment of the present invention, the device parameter includes a device resolution. Step 454 can choose the independent video layer stream as the at least one separate video stream when the device resolution corresponds to a first resolution. Step 454 can choose the independent video layer stream and each of the at least one dependent video layer streams as the at least one separate video stream when the device resolution corresponds to a second resolution that is higher than the first resolution.

In an embodiment of the present invention, the device parameter includes a power state of the remote device. Step 454 can choose the independent video layer stream as the at least one separate video stream when the power states corresponds to a first power state. Step 454 can choose the independent video layer stream and each of the at least one dependent video layer streams as the at least one separate video stream when the power states corresponds to a second power state that is higher than the first power state.

FIG. 26 is a flowchart representation of a method in accordance with the present invention. In particular, a method is presented for use with one or more of the functions and features presented in conjunction with FIGS. 1-25. In step 460, at least a portion of the video signal is generated by a transcoding that is based on the device parameter.

FIG. 27 is a flowchart representation of a method in accordance with the present invention. In particular, a method is presented for use with one or more of the functions and features presented in conjunction with FIGS. 1-26. In step 470, a device parameter is transmitted to a remote device. In step 472, a video signal is received from the remote device over at least one RF communications channel, wherein the video signal is transmitted as at least one separate video layer stream, chosen based on the device parameter from, an independent video layer stream and at least one dependent video layer streams that require the independent video layer for decoding.

In an embodiment of the present invention, the device parameter includes a device resolution and/or a power state of the remote device.

FIG. 28 is a flowchart representation of a method in accordance with the present invention. In particular, a method is presented for use with one or more of the functions and features presented in conjunction with FIGS. 1-27. Step 480 includes receiving an independent video layer stream and a first dependent video layer stream that requires the independent video layer for decoding. In step 482, a transcoded video signal is generated based at least one of the independent video stream and the dependent video layer stream.

In an embodiment of the present invention, in a first mode of operation, step 482 includes synchronizing and combining the independent video layer stream and the first dependent video layer stream to generate the transcoded video signal. In a second mode of operation, step 482 includes synchronizing and combining the independent video layer stream and the first dependent video layer stream to form a synchronized video signal and further includes transcoding the synchronized video signal to generate the transcoded video signal. Also, in another mode of operation, step 482 can generate the transcoded video signal from the independent video layer stream without the dependent video layer stream. In a third mode of operation, step 482 generates the transcoded video signal by transcoding the independent video layer stream.

The independent video layer stream can include a first plurality of motion vector data corresponding to a plurality of motion vectors, the first plurality of motion vector data representing a plurality of most significant bits of each of the plurality of motion vectors, wherein the first dependent video layer stream can include a second plurality of motion vector data corresponding to the plurality of motion vectors, the second plurality of motion vector data representing a plurality of least significant bits of each of the plurality of motion vectors, and wherein the second video layer stream does not include the first plurality of motion vector data.

The independent video layer stream can includes a plurality of grayscale data, wherein the first dependent video layer stream includes a plurality of color data, and wherein the second video layer stream does not include the plurality of grayscale data.

FIG. 29 is a flowchart representation of a method in accordance with the present invention. In particular, a method is presented for use with one or more of the functions and features presented in conjunction with FIGS. 1-28 and in particular with the method of FIG. 28. In step 490, a second dependent video layer stream is received, and step 482 is further based on the second dependent video layer stream.

Figure 30:
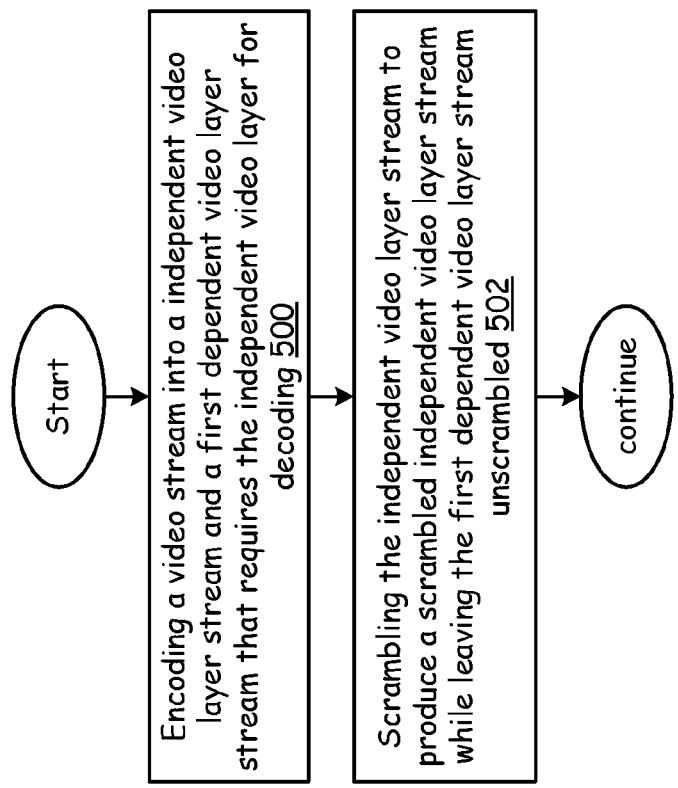
FIG. 30 is a flowchart representation of a method in accordance with the present invention.

FIG. 30 is a flowchart representation of a method in accordance with the present invention. In particular, a method is presented for use with one or more of the functions and features presented in conjunction with FIGS. 1-29. In step 500, a video stream is encoded into a independent video layer stream and a first dependent video layer stream that requires the independent video layer for decoding. In step 502, the independent video layer stream is scrambled to produce a scrambled independent video layer stream while leaving the first dependent video layer stream unscrambled.

In an embodiment of the present invention step 502 includes encrypting the independent video layer stream. Step 500 can further include encoding the video stream into a second dependent video layer stream, and wherein scrambling the independent video layer stream further leaves the second dependent video layer stream unscrambled. The independent video layer stream can include a first plurality of motion vector data corresponding to a plurality of motion vectors, the first plurality of motion vector data representing a plurality of most significant bits of each of the plurality of motion vectors, wherein the first dependent video layer stream includes a second plurality of motion vector data corresponding to the plurality of motion vectors, the second plurality of motion vector data representing a plurality of least significant bits of each of the plurality of motion vectors, and wherein the second video layer stream does not include the first plurality of motion vector data.

The independent video layer stream can include a plurality of grayscale data, wherein the first dependent video layer stream includes a plurality of color data, and wherein the second video layer stream does not include the plurality of grayscale data.

Figure 31:
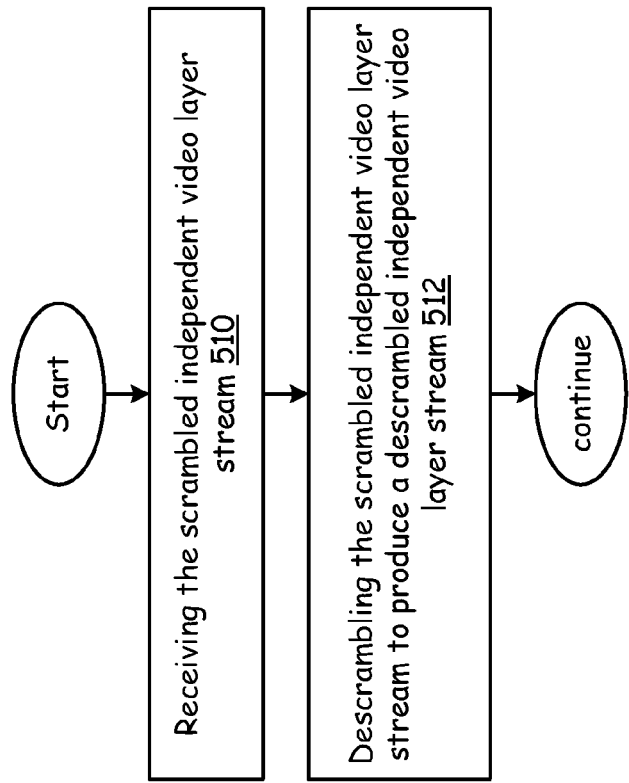
FIG. 31 is a flowchart representation of a method in accordance with the present invention.

FIG. 31 is a flowchart representation of a method in accordance with the present invention. In particular, a method is presented for use with one or more of the functions and features presented in conjunction with FIGS. 1-30 and particularly with the method of FIG. 30. In step 510, the scrambled independent video layer stream is received. In step 512, the scrambled independent video layer stream is descrambled to produce a descrambled independent video layer stream.

Figure 32:
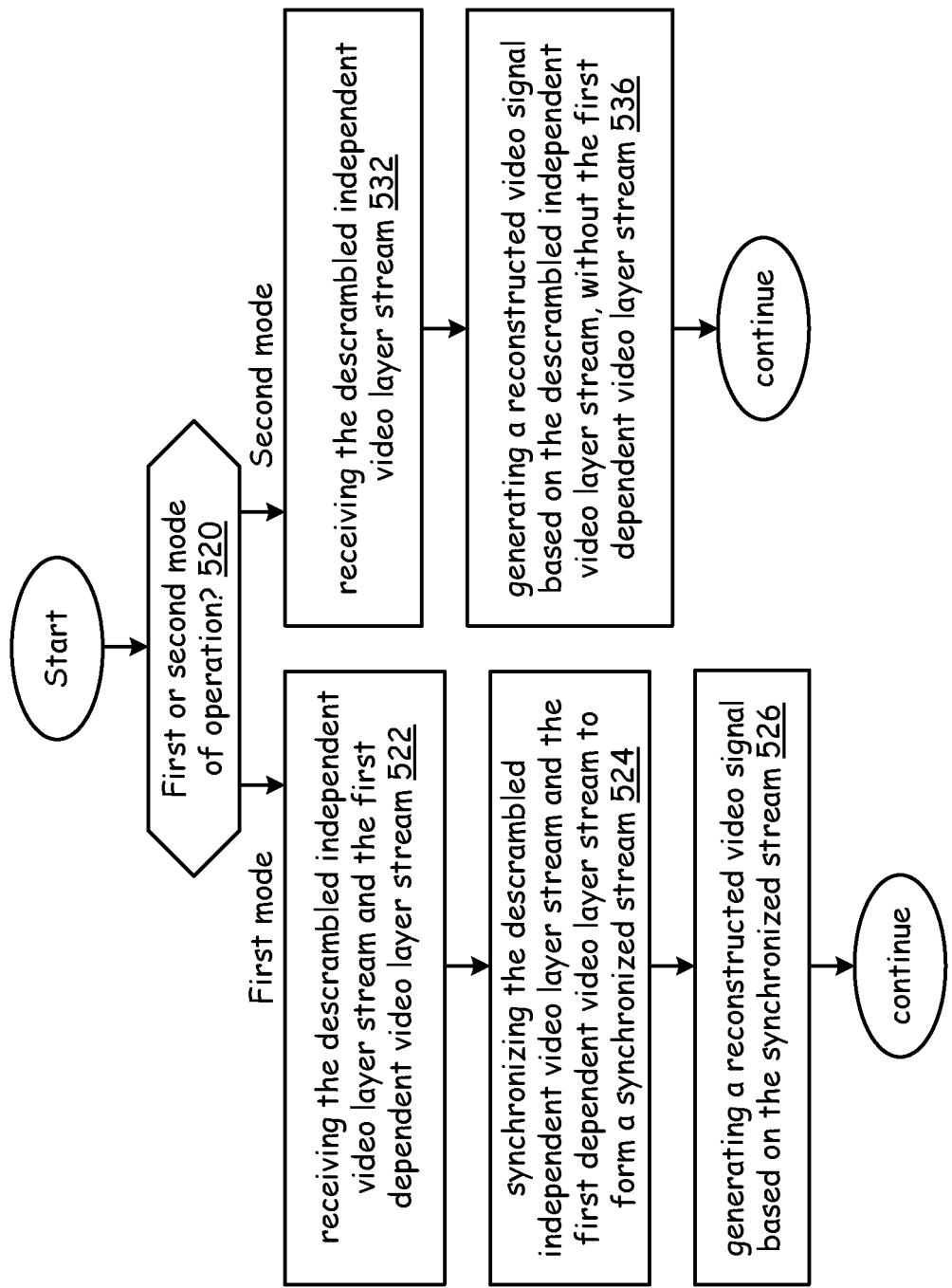
FIG. 32 is a flowchart representation of a method in accordance with the present invention.

FIG. 32 is a flowchart representation of a method in accordance with the present invention. In particular, a method is presented for use with one or more of the functions and features presented in conjunction with FIGS. 1-30 and particularly with the methods of FIG. 30-31. In step 520, the method determines if the method or device is operating in a first or second mode of operation. In a first mode of operation, the method proceeds to step 522 of receiving the descrambled independent video layer stream and the first dependent video layer stream. In step 524, the descrambled independent video layer stream and the first dependent video layer stream are synchronized to form a synchronized stream. In step 526, a reconstructed video signal is generated based on the synchronized stream.

In a second mode of operation, the method proceeds to step 532 of receiving the descrambled independent video layer stream. In step 536, a reconstructed video signal is generated based on the descrambled independent layer stream, without the first dependent video layer stream.

Figure 33:
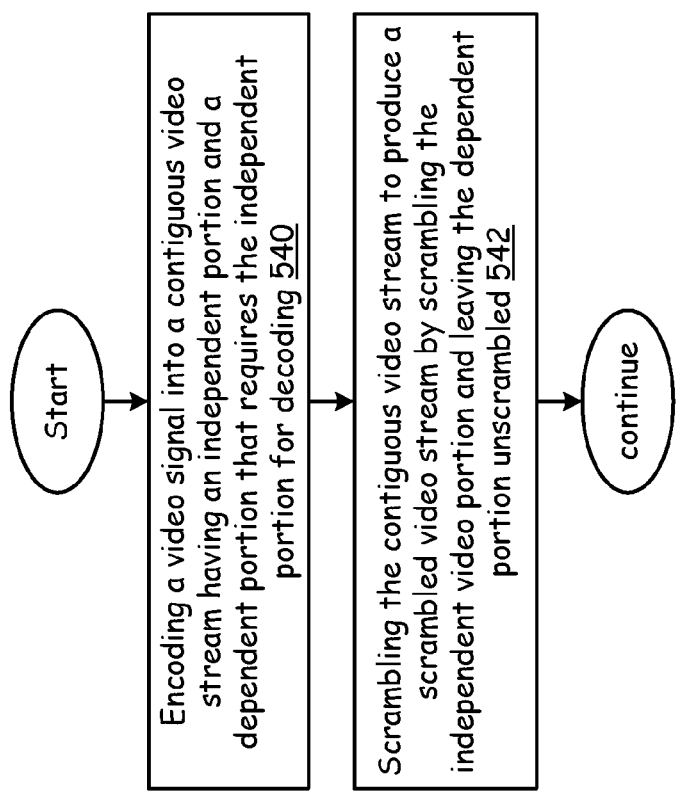
FIG. 33 is a flowchart representation of a method in accordance with the present invention.

FIG. 33 is a flowchart representation of a method in accordance with the present invention. In particular, a method is presented for use with one or more of the functions and features presented in conjunction with FIGS. 1-32. In step 540, a video signal is encoded into a contiguous video stream having an independent portion and a dependent portion that requires the independent portion for decoding. In step 542, the contiguous video stream is scrambled to produce a scrambled video stream by scrambling the independent video portion and leaving the dependent portion unscrambled.

In an embodiment of the present invention, step 542 includes encrypting the independent portion. The independent portion can include a plurality of I frames of the contiguous video stream and/or digital rights management data of the contiguous video stream. The dependent portion can includes a plurality of B frames of the contiguous video stream and/or a plurality of P frames of the contiguous video stream.

Figure 34:
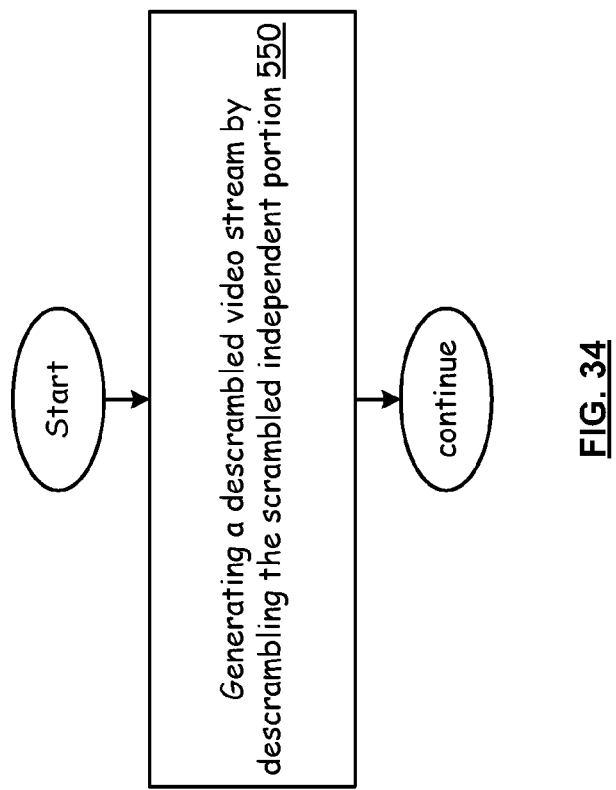
FIG. 34 is a flowchart representation of a method in accordance with the present invention.

FIG. 34 is a flowchart representation of a method in accordance with the present invention. In particular, a method is presented for use with one or more of the functions and features presented in conjunction with FIGS. 1-33 and particularly the method of claim 33. In step 550, a descrambled video stream is generated by descrambling the scrambled independent portion. Step 550 can include separating the scrambled independent portion of the scrambled video stream, producing a descrambled independent portion from the scrambled independent portion, and producing the descrambled video stream by synchronizing the descrambled independent portion with the dependent portion.

Figure 35:
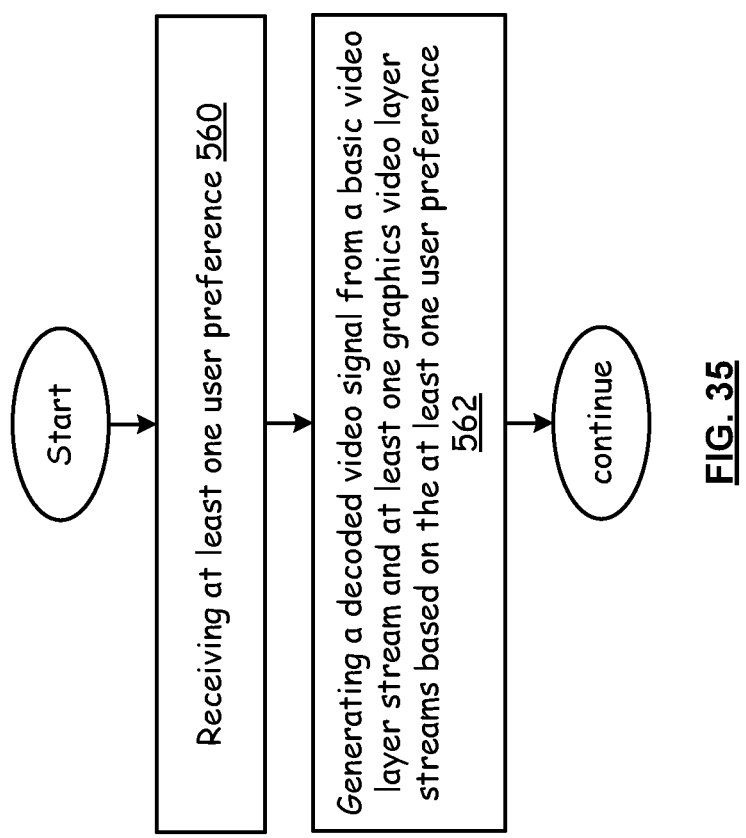
FIG. 35 is a flowchart representation of a method in accordance with the present invention.

FIG. 35 is a flowchart representation of a method in accordance with the present invention. In particular, a method is presented for use with one or more of the functions and features presented in conjunction with FIGS. 1-34. In step 560, at least one user preference is received. In step 562, a decoded video signal is generated from a basic video layer stream and at least one graphics layer streams based on the at least one user preference.

In an embodiment of the present invention the at least one graphics layer streams includes data in accordance with a plurality of presentation options, wherein the at least one user preference selects at least one of the plurality of presentation options, and wherein generating the decoded video signal includes applying the presentation options in the decoded video signal. The basic video layer stream and at least one graphics layer streams can correspond to a video program and wherein generating the decoded video signal includes storing the at least one user preference when the video program is decoded a first time and applying the presentation options when the video program is decoded a second time, subsequent to the first time. The basic video layer stream and at least one graphics layer streams can correspond to a first video program and wherein generating the decoded video signal includes storing the at least one user preference when the first video program is decoded and applying the presentation options when the a second video program is decoded and wherein the second video program includes the at least one of the plurality of presentation options.

Step 562 can include producing the decoded video signal from the basic video layer stream and not the graphics layer stream when the at least one user preference includes a first data value. Step 562 can include producing the decoded video signal from the basic video layer stream and each of the at least one graphics layer streams when the at least one user preference includes a second data value. Step 562 can include synchronizing and combining the independent video layer stream and at least one dependent video layer streams and decoding the combined stream.

Step 560 can include receiving the at least one user preference from a remote control device during a set-up of the video processing device. The basic video layer stream and at least one graphics layer streams correspond to a video program, and step 560 can include receiving the at least one user preference from a remote control device during production of the decoded video signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), et cetera., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, et cetera, provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A video transmission system comprising:
  a transceiver module that receives a device parameter from a remote device and that transmits a video signal to the remote device;
  a control module, coupled to the transceiver module, that chooses one of: a first mode of operation and a second mode of operation, responsive to the device parameter; and
  a video encoder, coupled to the transceiver module and the control module, that adaptively encodes the video signal based on the device parameter to include an independent video layer stream in the first mode of operation and the independent video layer stream and at least one dependent video layer stream that is dependent upon the independent video layer for decoding in the second mode of operation.

2. The video transmission system of claim 1 wherein the device parameter includes a device resolution.

3. The video transmission system of claim 2 wherein the control module chooses the first mode of operation when the device resolution corresponds to a first resolution.

4. The video transmission system of claim 3 wherein the control module chooses the second mode of operation when the device resolution corresponds to a second resolution that is higher than the first resolution.

5. The video transmission system of claim 1 wherein the device parameter includes a power state of the remote device.

6. The video transmission system of claim 5 wherein the control module chooses the first mode of operation when the power states corresponds to a first power state.

7. The video transmission system of claim 6 wherein the control module chooses the second mode of operation when the power state corresponds to a second power state that is higher than the first power state.

8. A mobile video device comprising:
  a transceiver module that transmits a device parameter to a remote server and that receives a video signal from the remote server over at least one RF (radio frequency) communications channel, wherein the video signal is adaptively encoded, based on the device parameter, as an independent video layer stream in a first mode of operation and the independent video layer stream and at least one dependent video layer stream that is dependent upon the independent video layer for decoding in a second mode of operation.

9. The mobile video device of claim 8 wherein the device parameter includes a device resolution.

10. The mobile video device of claim 8 wherein the device parameter includes a power state of the remote device.

11. A method comprising:
  receiving a device parameter from a remote device;
  adaptively transcoding and transmitting a video signal to the remote device, wherein the video signal is adaptively transcoded to include an independent video layer stream in a first mode of operation and is adaptively transcoded to include the independent video layer stream and at least one dependent video layer stream that is dependent upon the independent video layer for decoding in a second mode of operation; and
  wherein the adaptive transcoding includes choosing one of: the first mode of operation and the second mode of operation, responsive to the device parameter.

12. The method of claim 11 wherein the device parameter includes a device resolution.

13. The method of claim 12 wherein the adaptive coding chooses the first mode of operation when the device resolution corresponds to a first resolution.

14. The method of claim 13 wherein the adaptive coding chooses the second mode of operation when the device resolution corresponds to a second resolution that is higher than the first resolution.

15. The method of claim 11 wherein the device parameter includes a power state of the remote device.

16. The method of claim 15 wherein the adaptive coding chooses the first mode of operation when the power states corresponds to a first power state.

17. The method of claim 16 wherein the adaptive coding chooses the second mode of operation when the power state corresponds to a second power state that is higher than the first power state.

18. A method comprising:
  transmitting a device parameter to a remote server;
  receiving a video signal from the remote device over at least one RF (radio frequency) communications channel, wherein the video signal is adaptively encoded and to include an independent video layer stream in a first mode of operation and wherein the video signal is adaptively encoded to include the independent video layer stream and at least one dependent video layer stream that is dependent upon the independent video layer for decoding in a second mode of operation.

19. The method of claim 18 wherein the device parameter includes a device resolution.

20. The method of claim 19 wherein the device parameter includes a power state of the remote device.

* * * * *